May 14, 1963 G. SHAND ET AL 3,090,032
AUTOMATIC TRAFFIC SIGNALLING SYSTEMS
Filed Aug. 27, 1957 18 Sheets-Sheet 1
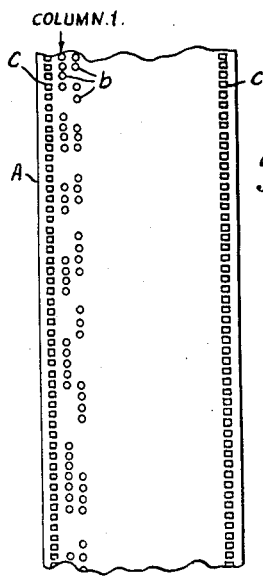
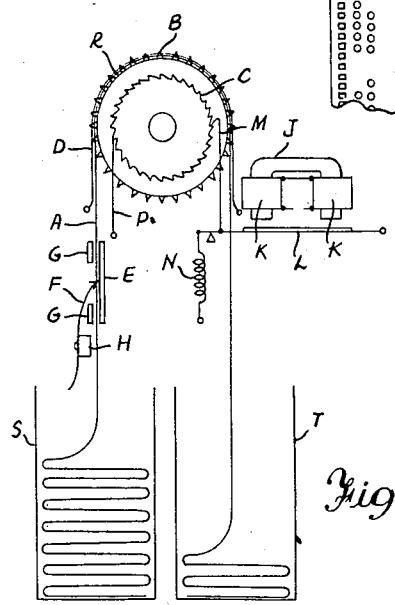
INVENTORS
GEORGE SHAND
GEORGE GEOFFREY ATKINSON
ATTORNEY

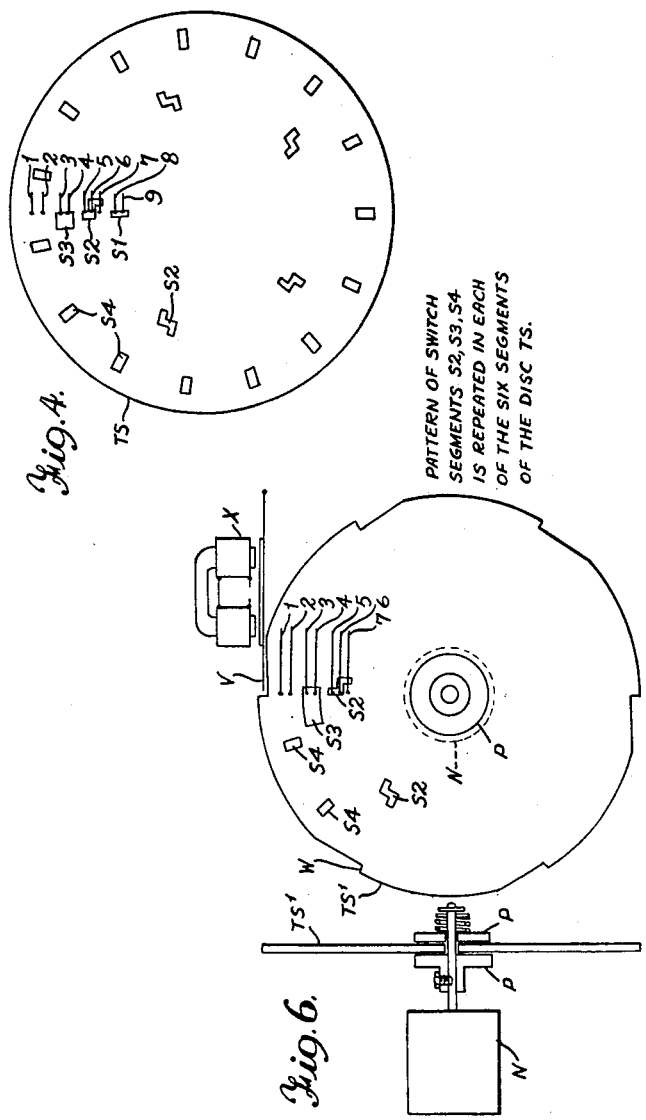

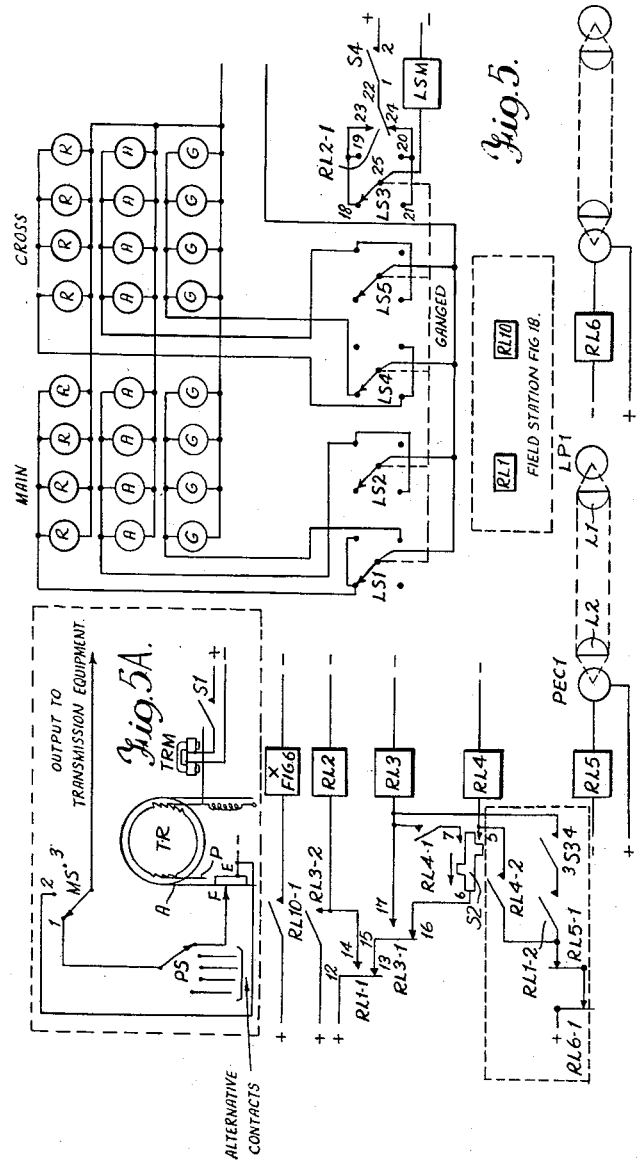

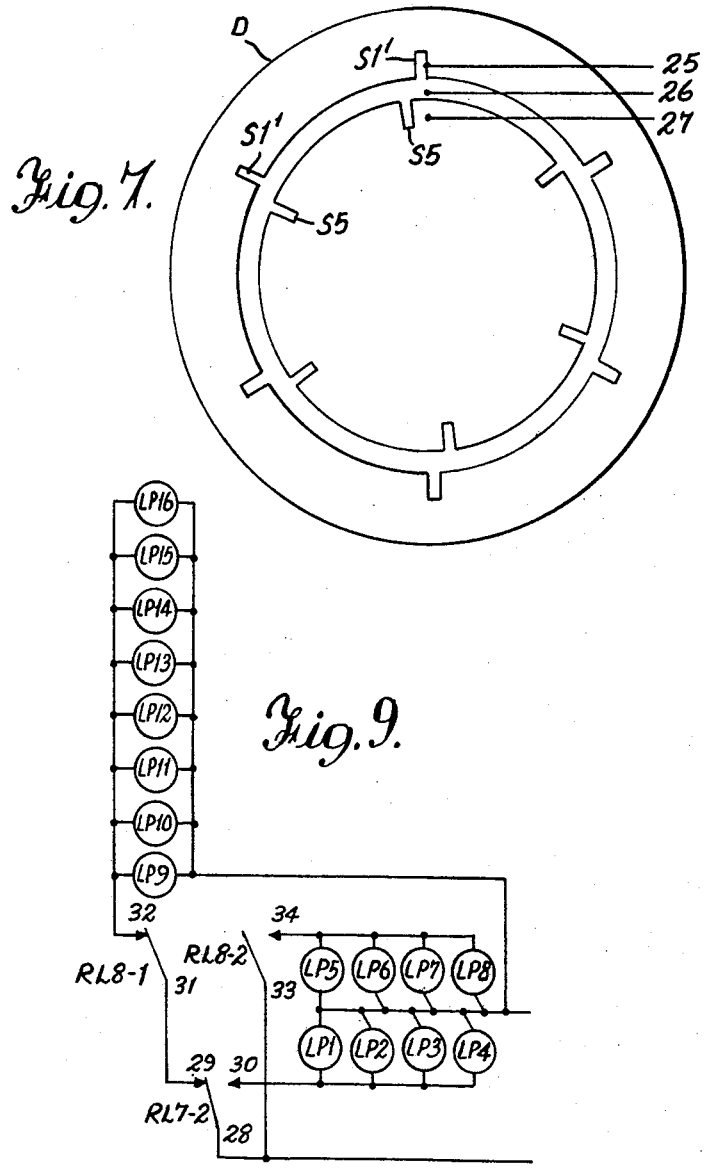

INVENTORS
GEORGE SHAND
GEORGE GEOFFREY ATKINSON
ATTORNEY

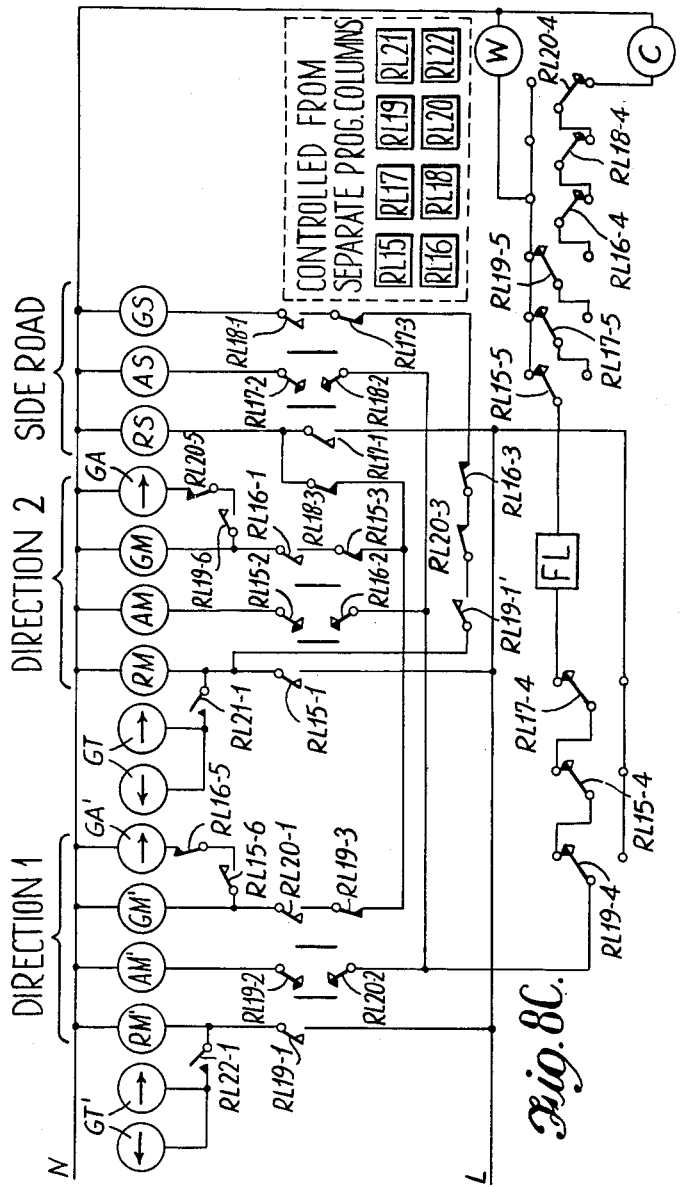

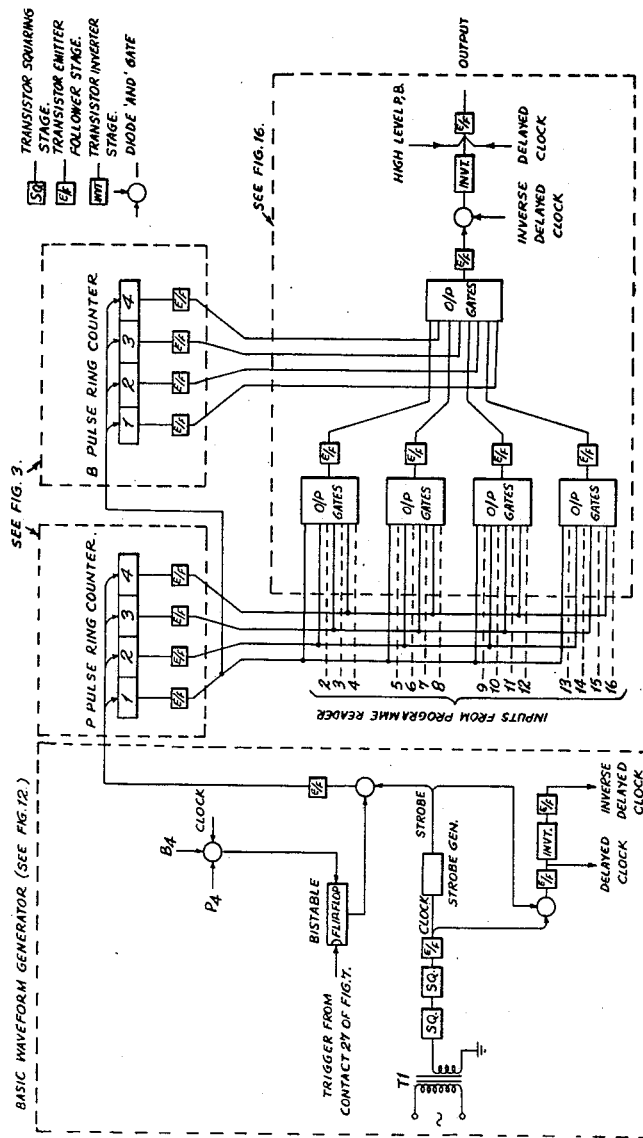

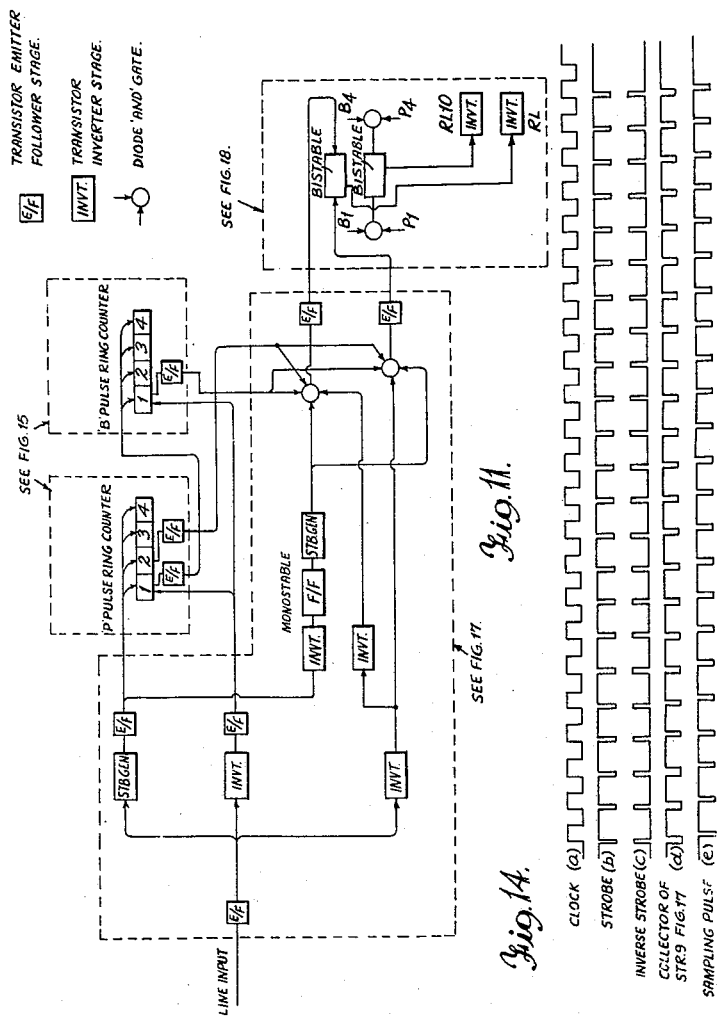

May 14, 1963

G. SHAND ET AL 3,090,032

AUTOMATIC TRAFFIC SIGNALLING SYSTEMS

Filed Aug. 27, 1957

INVENTORS
GEORGE SHAND
GEORGE GEOFFREY ATKINSON

ATTORNEY

May 14, 1963 G. SHAND ET AL 3,090,032
AUTOMATIC TRAFFIC SIGNALLING SYSTEMS
Filed Aug. 27, 1957 18 Sheets-Sheet 15

INVENTORS
GEORGE SHAND
GEORGE GEOFFREY ATKINSON
ATTORNEY

INVENTORS
GEORGE SHAND
GEORGE GEOFFREY ATKINSON
ATTORNEY

May 14, 1963   G. SHAND ET AL   3,090,032
AUTOMATIC TRAFFIC SIGNALLING SYSTEMS
Filed Aug. 27, 1957   18 Sheets-Sheet 18

INVENTORS
GEORGE SHAND
GEORGE GEOFFREY ATKINSON
ATTORNEY

3,090,032
Patented May 14, 1963

1

3,090,032
AUTOMATIC TRAFFIC SIGNALLING SYSTEMS
George Shand, Sale, and George Geoffrey Atkinson, Stretford, England, assignors to Associated Electrical Industries (Manchester) Limited, a British company
Filed Aug. 27, 1957, Ser. No. 680,554
Claims priority, application Great Britain Aug. 29, 1956
1 Claim. (Cl. 340—41)

This invention relates to automatic traffic signalling systems, with particular but non-exclusive application to road traffic signalling.

Automatic road traffic signalling systems are well known, the two most common types currently in use being fixed time sequence and mat-operated. In the first type the clearance periods for each roadway are preselected according to the respective volumes of traffic. In the second system waiting vehicles register their presence by passing over a "mat" laid in the roadway; after clearance has been given, subsequent vehicles in the queue bias the timing of the clearance period in favour of the cleared roadway in accordance with the rate at which vehicles cross the mat. The result is that the respective clearance periods are automatically varied in accordance with the volume of traffic. While the second system can adjust itself to traffic demands, the first system is inflexible. With the second system however there is the possibility that sequences of vehicle actuated signals leading into a city from the suburbs may become a major cause of congestion in the city at inwards peak periods since the incoming traffic flow may be virtually unimpeded by the traffic signals rather than being held and allowed to proceed at controlled rates. Against this, the many starts and stops that may otherwise be required in negotiating a series of controlled intersections can be a major cause of delay and annoyance. The time taken for traffic lights to change from a holding (red) aspect to the clearance (green) aspect where an intervening amber aspect is included, and the starting waves travelling along the column of waiting vehicles at each successive clearance period, reduce considerably the traffic handling capabilities of the roadway.

With a view to providing a controlled optimum flow of traffic, so-called flexible progressive systems have been proposed by which the cycles of operation of the traffic lights at successive intersections along a highway are synchronised with each other but are relatively offset in time so that the lights will clear progressively in front of a vehicle proceeding along the highway at an appropriate speed determined by the offset times. Once a vehicle has been held at a check point it can then, in theory at least, proceed without further stop throughout the length of the highway, provided that its speed is correct. Since vehicles will be despatched in groups from the check point the gaps between successive groups can conveniently be utilised for permitting pedestrians to cross.

The vehicle speed appropriate for unimpeded progress along progressively controlled highway may be indicated to drivers by illuminated speed notices and may be varied according to the volume of traffic by suitably selecting the time offset. The changing pattern of traffic flow, particularly the inwards and outwards peaks of traffic occurring between a city and suburban areas in the morning and evening respectively complicate the synchronisation problem and some roads carrying a heavy peak traffic at one period of the day become more quiet than crossing roadways at other periods of the day. Traffic peaks occur regularly at known times daily, and special peak periods occur at public holidays, sporting events and so on. Weather conditions, too, cause considerable variations in loading, particularly in the number of private vehicles, and the seasons of the year have their effect. In general, however, the approximate volume and distribution of traffic can be predicted for any particular time of day, on any day of the year, and programmes of appropriate traffic signal sequences can be devised to regulate the flow accordingly.

With vehicle actuated systems a small number of closely positioned intersections may be co-ordinated reasonably well and programming may also be introduced, but attempts at synchronisation over wide areas tend to decrease the overall efficiency of the system. Programmed progressive systems have been proposed in which the operation of traffic lights at a number of intersections is controlled at least in some respects from a central control location. Thus in one such centralised system, timing discs corresponding to those usually employed at individual intersection controllers are assembled at the central control location and are mechanically coupled together in a variable manner to permit different relative timings between the controlled intersections; the actual switching operations for the traffic lights taking place at the central office under control of the timing discs, with power leads extending to the lights from the control office usually by way of multi-core lighting cable. Another system employs intersection controllers including preset motor driven timing devices which define the offset times and the clearance ratios for the intersections, while the cycle times can be varied by variation of the voltage applied to all the intersection controllers over a common supply cable from a central location. This latter system therefore requires that for a change of programme involving a change of offset time or of clearance ratio the intersection controllers have to be visited and appropriate adjustments made to them. In yet another centralised system selectable cycle timers and offset timers are provided at each intersection and control signals transmitted form a central location when a change in programme is required, select the appropriate timers for the new programme. The number of possible variations obtainable under centralised control in this latter system is thus restricted by the number of alternative timers provided in the intersection controller.

It is an object of the invention to provide a flexible traffic signalling system which, while being applicable to the control of a single intersection, is especially advantageous in a progressive, multiple intersection system with centralised programming, in which latter application it can avoid at least some of the indicated limitations and drawbacks of existing schemes.

It does this by employing a programme which defines at least the end of each clearance period and each holding period for a traffic phase at an intersection (namely each time at which the traffic signals controlling that phase have to be changed from clearance to holding aspect or vice versa) and which is translated into corresponding control signals which are applied to control a programme responding device located in the vicinity of the intersection and arranged to govern the traffic signals normally as dictated by the programme but with possible modification should, for instance, provision be made as will appear hereafter for extending a programmed main road clearance period in the absence of side road traffic.

Thus in the simplest case the programme can define the duration of successive holding and clearance periods for a main road at its intersection with a crossing road; this programme information could be translated into the presence and absence respectively of a marking, that is a distinctive potential, on a control wire leading to a programme responding relay at the intersection, which latter could respond to the presence or absence of such marking to control the traffic signals accordingly. At the intersection, at which there would thus be no need for timers to define the clearance and holding ratios, since these are effectively defined on the programme, the response of the relay to a change in the marking condition on the control wire would initiate changeover of the aspects presented to the main and cross roads. The usual amber and red-amber aspects presented during a changeover period may be timed by an appropriate amber timer at the intersection but even this timer may be eliminated, as will appear hereinafter, by also defining the amber and red-amber periods on the programme.

It is envisaged that the programme would usually be effective throughout the twenty-four hours of each day, but the possibility of it being at times discontinued, for instance at night time when traffic flow is very light, is not excluded. Since the programme has to define each clearance and holding period during such time as the programme is in force, and since it may be desired to enable the timings defined on the programme to be selected to within a few seconds, the programme is preferably recorded in binary, i.e. two-state, form along tracks of suitable length on some suitable recording medium. There would be at least one programme track for each function requiring to be independently controlled according to programme, some suitable form of reading apparatus being arranged to read along the individual tracks so as to abstract the programme information recorded thereon and convert it into corresponding control signals for transmission. It is at present considered that, taking into consideration the requirements of the reading apparatus, the programmes could most simply and cheaply be recorded as patterns of holes and blanks extending along a suitable paper or other tape in rows or columns constituting the tracks referred to, these holes and blanks constituting individual programme-defining elements which together represent a particular programme in dependence on the particular pattern in which they are arranged. The reading apparatus could then comprise electric contacts actuated according to the presence or absence of a hole to provide in the one instance a marking potential which is absent in the other. Other somewhat analogous forms of programme record can readily be imagined: for instance tape having its programme-defining elements in the form of conductive portions applied or omitted at particular positions along it may again be read by contacts, or tape having opaque and transparent portions may be read by photo-electric means.

As will be appreciated, the allocation of clearance periods can be readily varied according to expected traffic conditions at any time merely by making appropriate changes in the programme. Furthermore alternative programmes may be provided pertaining, for example, to week-days and Sundays respectively, in which case it is contemplated that such programmes may be recorded together, for instance as respective rows of holes along a punched tape, and the reading apparatus provided with means for selectively reading the relevant programme at any time. Furthermore all the traffic signals at an intersection may be governed by one and the same programme at any time, or signals for different traffic directions or phases may be independently governed by different programmes so organised, of course, as not to give conflicting clearances.

In employing the invention for co-ordinated control of a plurality of intersections, for instance in order to provide a progressive system, the signal sequences at the several intersections may be governed from a central location under the control of suitable programmes co-ordinating the signal sequences in timing and duration.

To provide this control from a central location, signals obtained from the reading apparatus in accordance with programmes relating to several intersections controlled, may be transmitted over separate wires or other communication channels to respective receiving, or "field," stations each of which by responding to the transmitted signals which relate thereto, controls traffic signals at these intersections in accordance with one or more of the programmes, depending on whether or not all the signals at the intersection concerned are controlled from the same programme. Preferably, however, the control location and the several receiving stations would be linked by a single channel over which the control signals intended for the different stations would be transmitted in coded form. A system employing coded signal transmission over a single channel will be described hereinafter.

In a system conforming to the invention provision may be made for taking over manual control of one or more of a plurality of controlled intersections in order to permit the setting up of an open route for the speedy passage of emergency vehicles. Furthermore the system may be organised for the setting up at different times, under control of appropriate programming, of alternative patterns of one-way streets selected to assist in, say, handling an inwards peak flow to a city in the morning and an outwards peak flow in the evening.

In order that the invention may be more clearly understood various embodiments and adaptations thereof will now be described with reference to the accompanying drawings in which:

FIG. 1 shows a portion of a typical punched-hole programme tape;

FIG. 2 shows a suitable apparatus for reading the programme tape, the illustration being merely diagrammatic;

FIGS. 3 and 4 show a schematic arrangement of the invention applied to a single intersection, FIG. 4 showing a particular arrangement of timing switch;

FIGS. 5 and 6 show a schematic arrangement of a switching system directly concerned with the control of one of a plurality of controlled intersections, FIG. 6 showing a particular arrangement of timing switch;

FIG. 5A shows a modification of the reading equipment circuitry;

FIG. 7 shows a particular arrangement of a timing switch for controlling the programme reader and the information transmission system;

Figure 8:
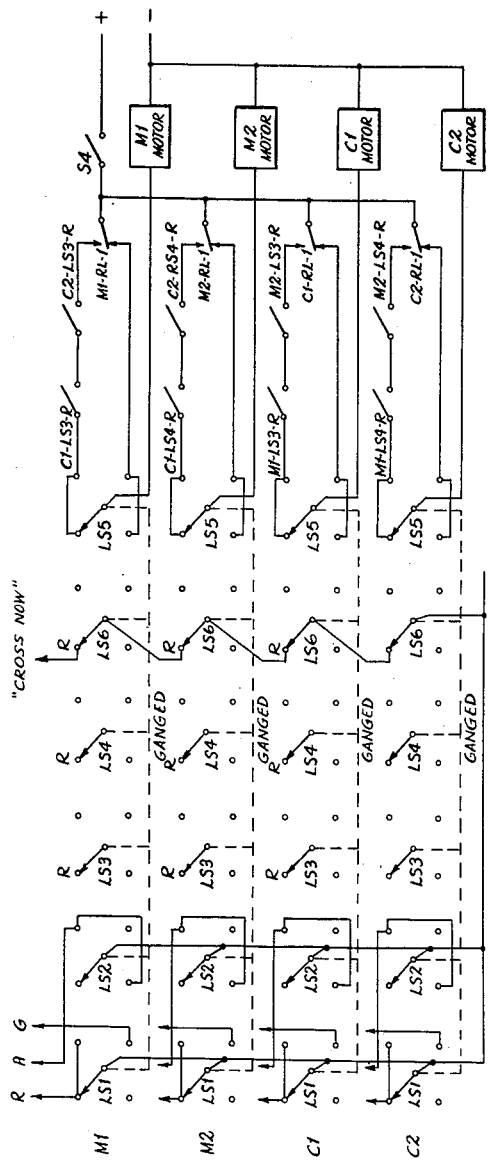
Figure 8A:
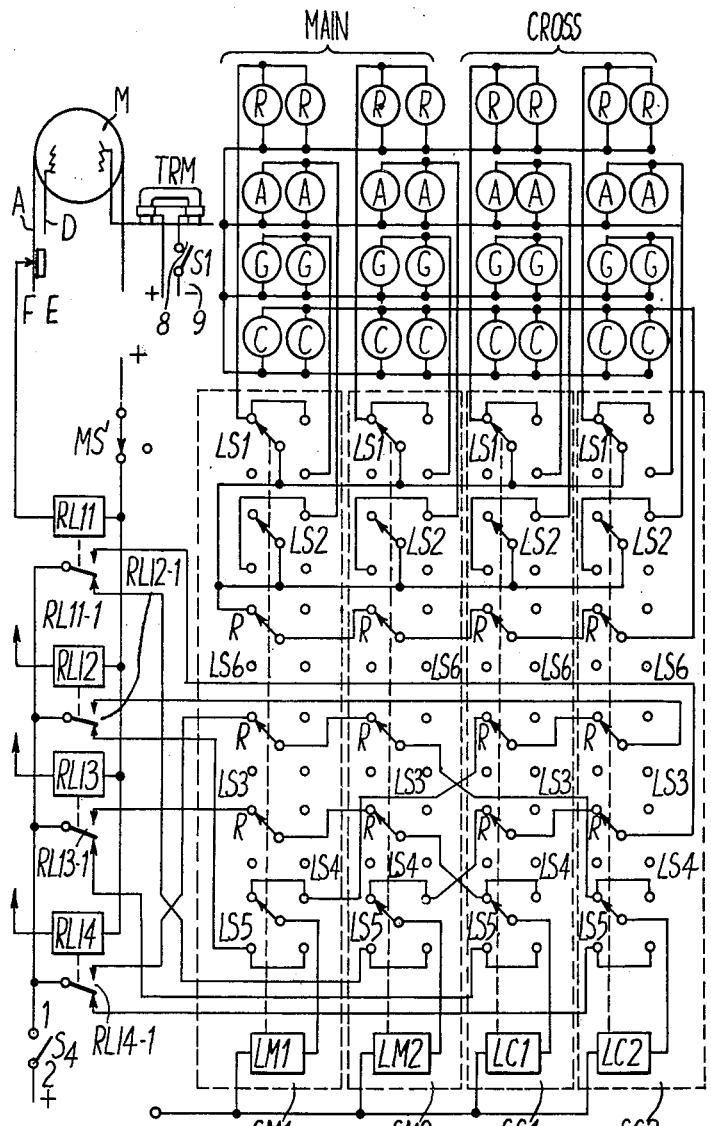
Figure 8B:
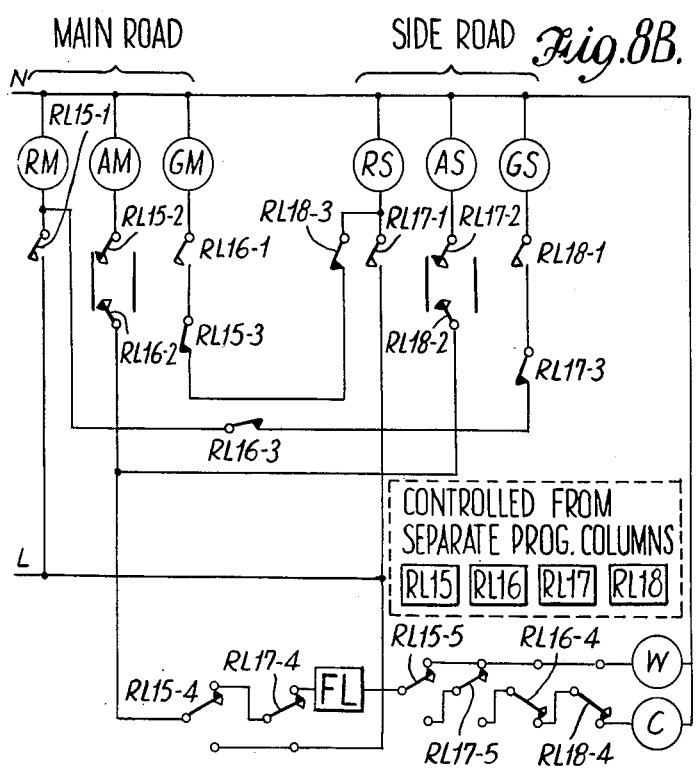
Figure 12:
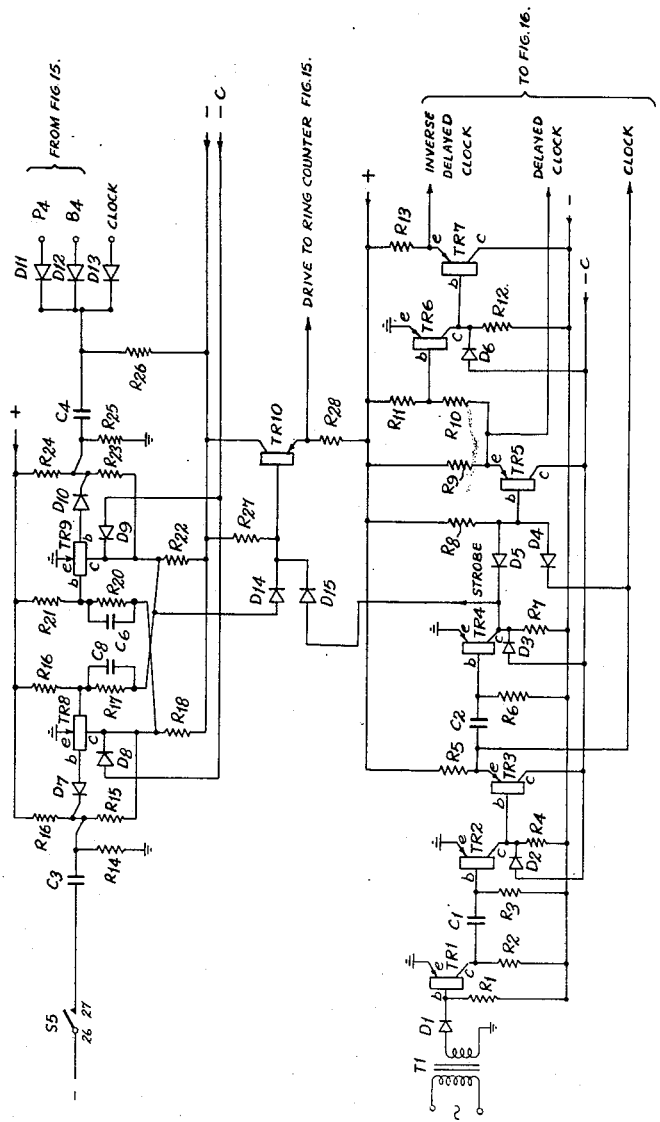
Figure 13:
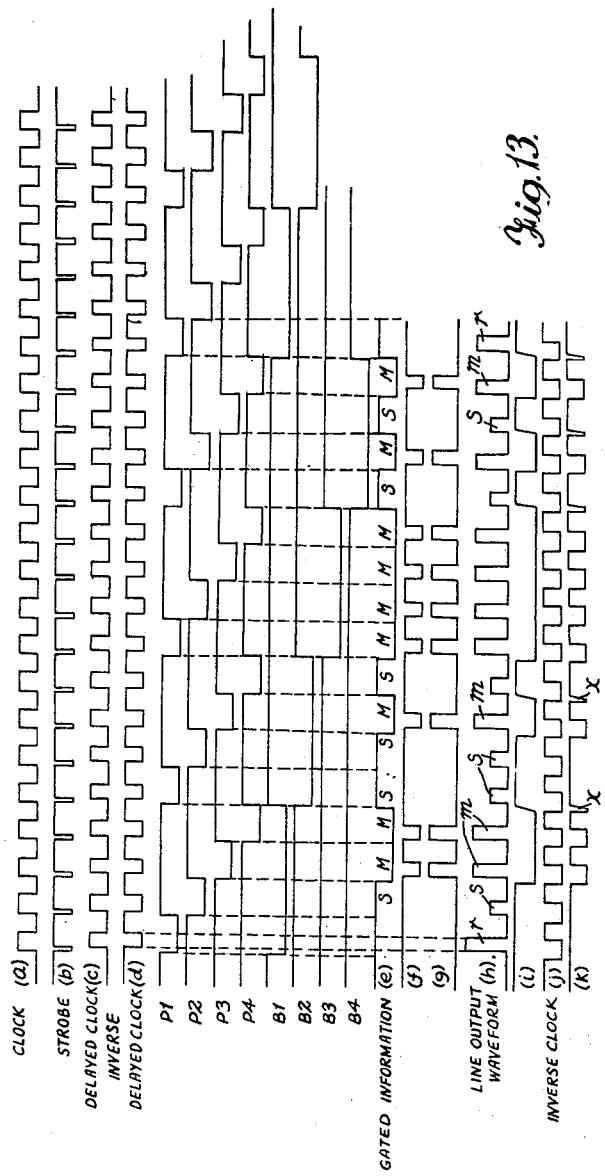
Figure 15:
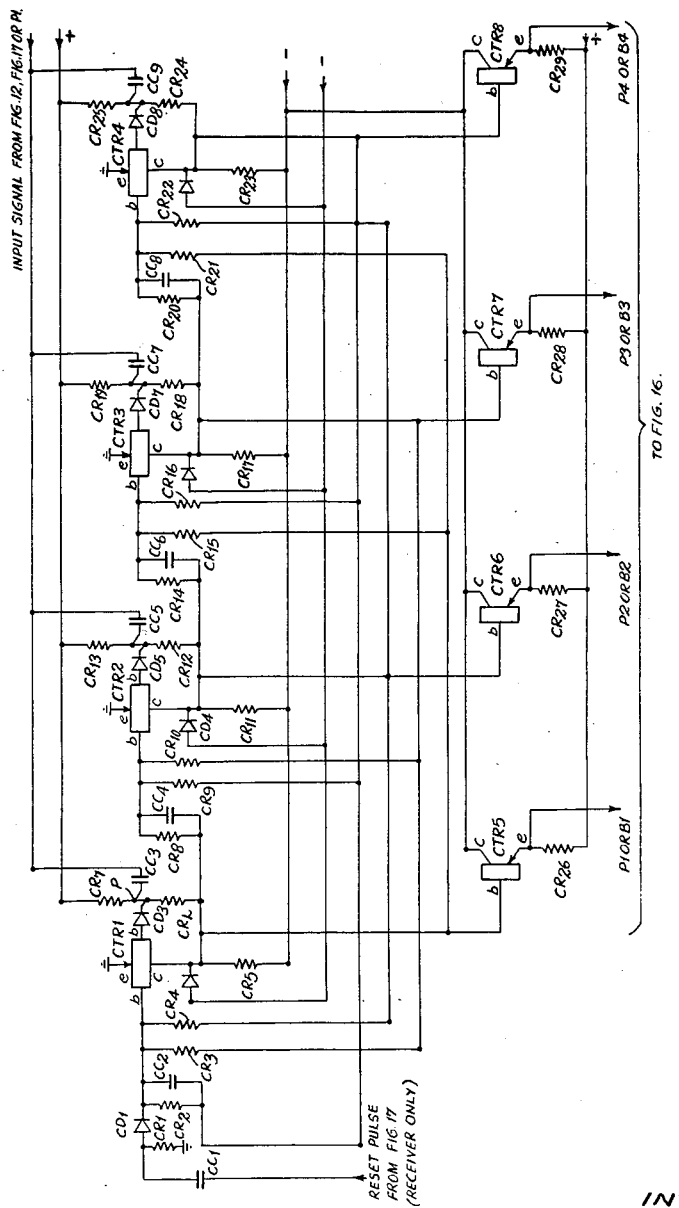
Figure 16:
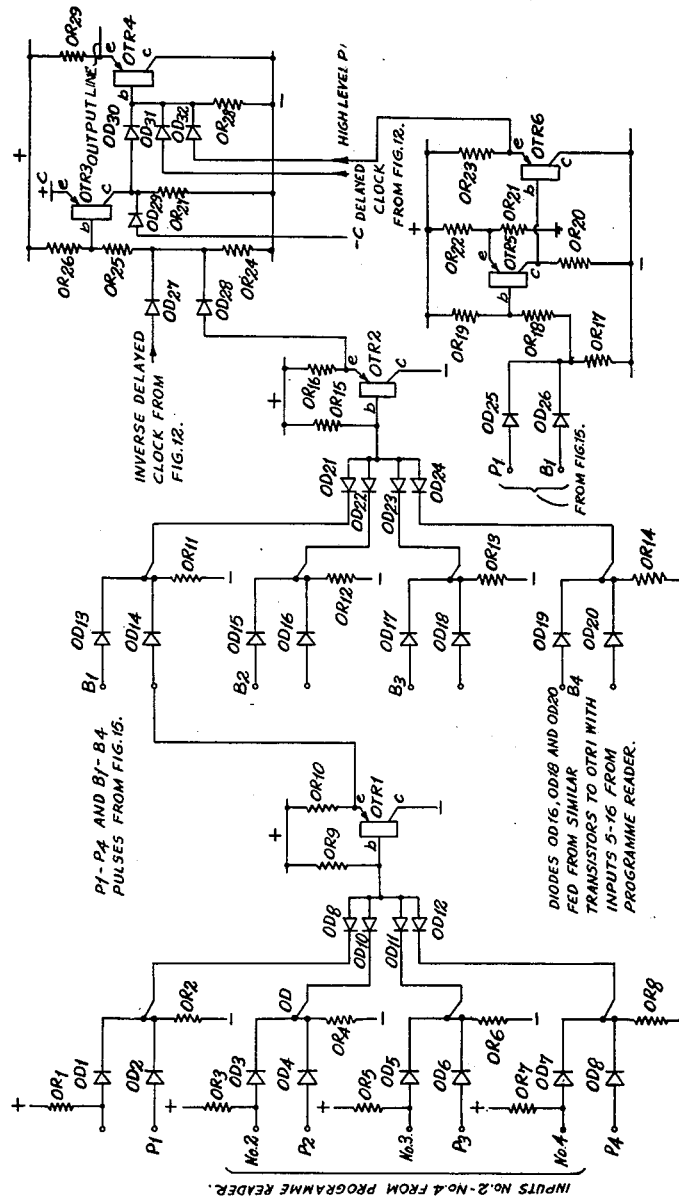
Figure 17:
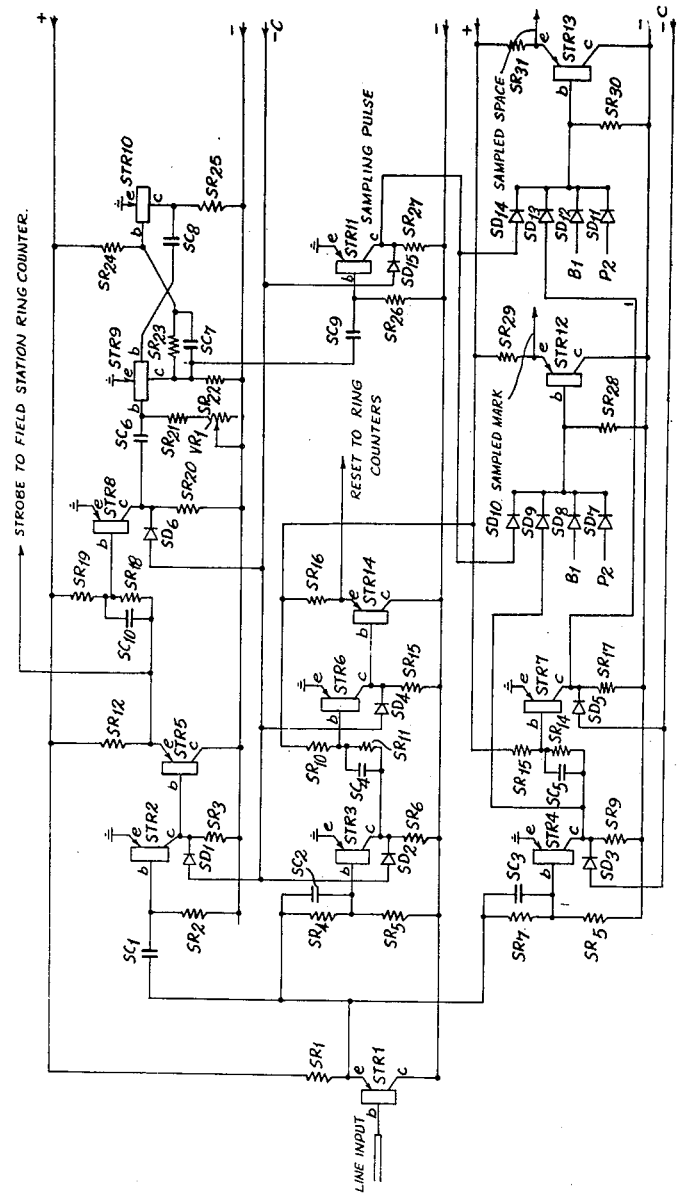
Figure 18:
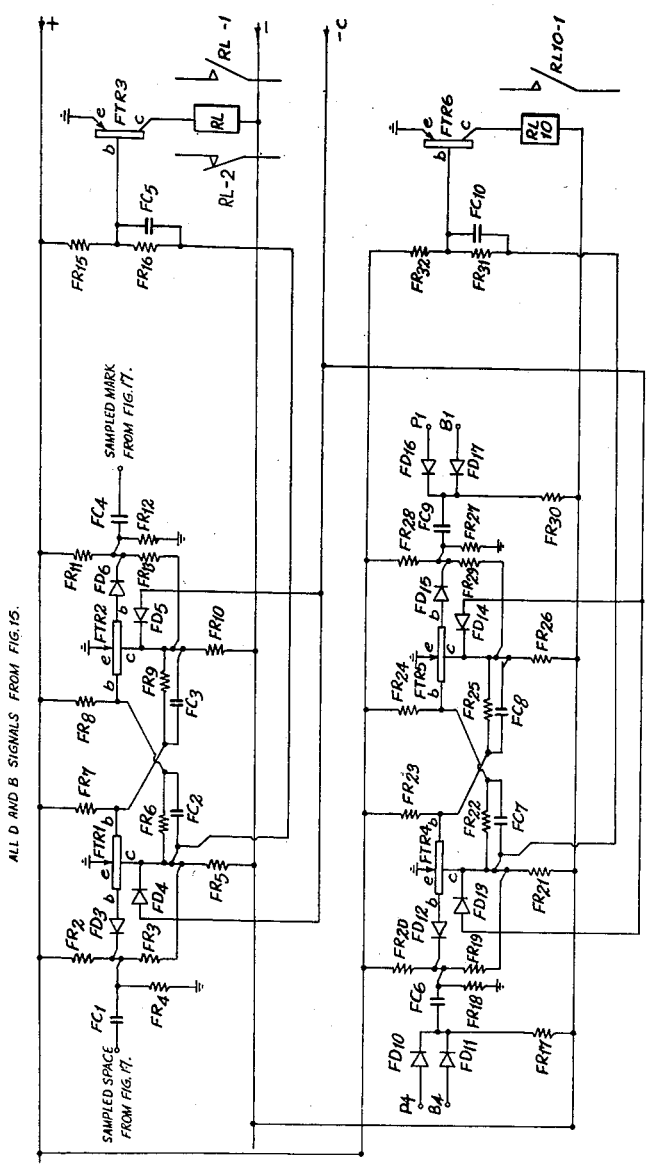

FIGS. 8A, 8B, and 8C illustrate modified circuit arrangements of which that of FIG. 8A permits individual control of main road traffic in opposite directions at an intersection, that of FIG. 8B eliminates the need for amber timing mechanism at any intersection, and that of FIG. 8C has both these features;

FIG. 9 illustrates additional circuitry which may be provided in connection with changing the traffic direction in a one-way street according to programme;

FIG. 10 shows a block diagram of a central transmitter;

FIG. 11 shows a block diagram of a typical field station;

FIG. 12 shows the circuit of the basic timing signal generator at the transmitter;

FIGS. 13 and 14 show the waveforms occurring at various points in the transmitter and a typical field station;

FIG. 15 is a circuit diagram of a four stage ring counter as used in the transmitter and the field station receivers;

FIG. 16 is a circuit diagram of the mixer in which digital control signals and timing signals are combined to produce an output signal for transmission to the field stations;

FIG. 17 is a circuit diagram of part of a typical field station receiver in which the digit signals and timing signals are separated; and FIG. 18 shows a circuit diagram of the part of the receiver in which selected digit signals are extracted and retained or "staticised."

Referring to FIG. 1 there is shown therein a preferred form of programme recording medium consisting of a tape A of, for example, paper on which the programme information is recorded in the form of a series of holes *b* punched through the tape. Sprocket holes *c* of which there may be one or more rows, serve to move the tape forward lengthwise for reading. A hole *b* or a blank portion existing opposite any sprocket hole *c* constitutes a programme-defining element in two-state (binary) form, that is, the tape either has a hole punched in it or is left unpunched at any position opposite a sprocket hole. A column or row extending lengthwise along the tape can represent the conditions required at any one set of signals over a period recorded in terms of sprocket hole units. For example the tape may be moved forward by one sprocket hole pitch once per minute in which case the minimum period for which any one set of conditions can exist, unless modified externally of the programme, is one minute. Of course, by repeating the same code a set of conditions may be extended to the number of units of time, whatever such unit may be, for which the code is repeated. In the following description it will be assumed that a hole represents the state of the signals as clearing main traffic and a blank portion of tape represents the state of the signals as clearing cross traffic; thus reading column 1 of the holes *b* in the tape A of FIG. 1, the sequence of events recorded shows that four time periods are occupied in clearing main traffic, followed by two time periods clearing cross traffic, followed by four time periods clearing main traffic and so on.

In the case of a single controlled crossing having two or more sets of signals controlled independently of each other by separate, but non-conflicting, programmes, and likewise in the case of a plurality of crossings controlled from a common control location, a corresponding number of columns would be required and a set of punchings extending in a row transversely across the tape would then represent the set of conditions required at the various field stations during one basic time period. Additional columns could be provided to give alternative programmes to suit different traffic conditions expected, for example, on various days of the week. The tape may be of sufficient width to carry at least all these programmes which run concurrently, but it will be evident as the description proceeds that the number of programmes catered for could be extended by running two or more tapes in synchronism. It is convenient although not essential for one tape to carry the entire programme for one day so that a repeat run could be made on several successive days on which the traffic pattern was expected to be similar. Of course, a variety of programme tapes could be run in synchronism and the information from the appropriate one selected.

Turning now to FIG. 2 which shows schematically the arrangement of a suitable apparatus for reading a perforated tape, the tape A passes upwards from the feed receptacle S over a roller R having sprockets B engaging with the sprocket holes mentioned above for the purpose of driving the tape forward. A ratchet wheel C, having the same number of teeth as the sprocket wheel, is engaged by a driving pawl M and a non-return pawl P. The pawl M is raised by one tooth pitch when an armature L is attracted to a yoke J on energisation of coils K from a source of electric current, the attracting force overcoming the tension of a spring N. On de-energisation of the electromagnet the armature L drops under the influence of the spring N and the pawl M moves the ratchet wheel C, roller R and tape A by one sprocket tooth pitch. The tape A is held firmly in contact with the roller R by a spring D to prevent the holes in the tape from slipping off the sprocket teeth B. As the tape is drawn upwards from the feed receptacle S it passes between guide plates G and a conducting bar E against which a plurality of contact fingers F (only one shown) bear through the tape, these fingers being carried on an insulating support H. The fingers F, of which there is one for each column in the tape, make contact with bar E when holes in the tape are opposite them and are insulated from the bar E in the absence of holes. The tape after passing through the reading apparatus passes into a receptacle T.

Figure 3:
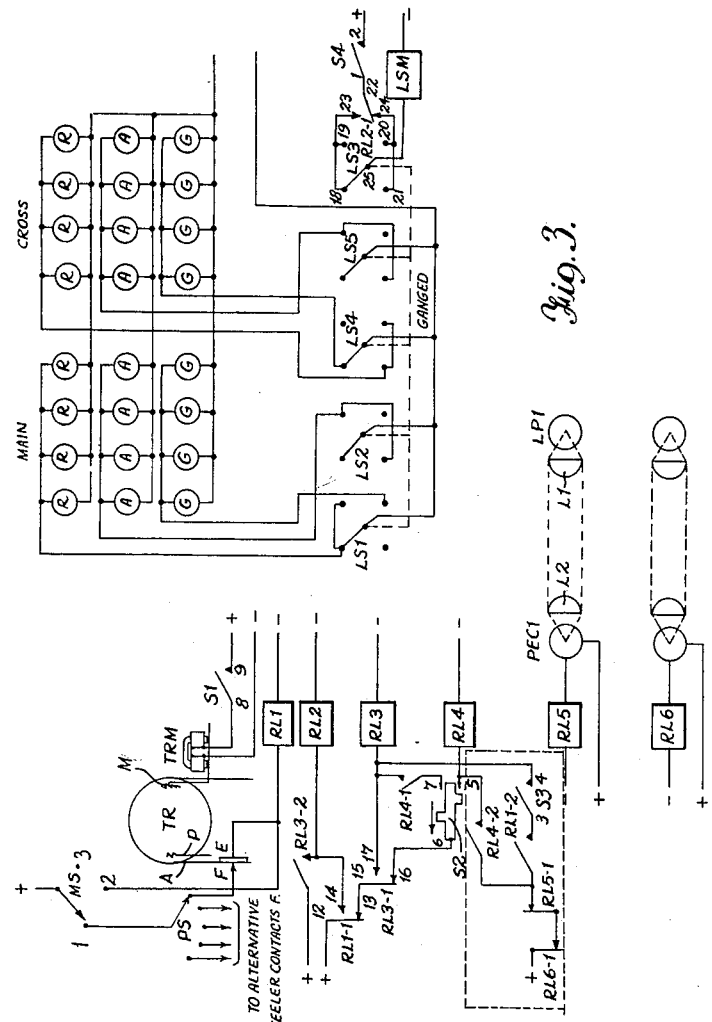

Referring to FIG. 3 which shows an application of the invention to the control of a single crossing, the essential component parts of the tape reader are the tape moving drum TR, electromagnet motor TRM, motor pawl M, non-return pawl P, programme tape A, conducting bar E and contact fingers F of which one only is shown. Switch PS allows selection of any column of holes by connecting the + line of a supply to the appropriate contact finger. The bar E is connected through the coil of a programme responding relay RL1 to the — line of the supply. Should the appropriate contact finger selected be insulated from bar E, namely in the absence of a hole in the tape A, relay RL1 is de-energised. In the presence of a hole, relay RL1 is energised. Relay RL1 has two sets of contacts RL1-1 and RL1-2. In the de-energised condition the contact RL1-1 makes connections 12—13 as shown and RL1-2 is broken. In the energised condition contact RL1-1 breaks connection 12—13 and makes connection 12-14, and contact RL1-2 is made. The contact arrangement is such that connection 12-14 is made before connection 12—13 is broken and that contact RL1-2 is also made before connection 12—13 is broken.

A relay RL2 is energised when connection 12-14 is made by contact RL1-1 and also when a relay RL3 is energised to make connection at its contacts RL3-2.

Referring to FIG. 4, TS is a rotating commutator switch driven by a synchronous clock type motor (not shown) at a speed which, for the purposes of the description, will be assumed to be one revolution per minute. It is to be understood, however, that the speed, number of switch contacts and relative timings of the contacts closing and opening, are not in any way to be regarded as limitations being specific merely for clarity of description. Switch TS comprises a clockwise rotating disc which carries conducting segments S1, S2, S3 and S4. Segment S1 closes connection 8—9 once per revolution. Segments S2, of which there are five equally spaced, close connection 5—6 five times per revolution and connection 6—7 five times per revolution, that is, once every twelve seconds. Connection 6—7 is made for half a second, and half a second after connection 6—7 breaks connection 5—6 is made for half a second. Eleven seconds thus elapse between connection 5—6 being made and connection 6—7 being subsequently made. Segment S3, of which there is only one, makes connection 3—4 for one second once per revolution. Segments S4, of which there are fifteen equally spaced, make connection 1—2 for half a second fifteen times per revolution, that is, every four seconds. Connections 8—9, and 3—4 are made by the segments S1 and S3 substantially simultaneously with the making of connection 5—6 by one of the segments S2 and the period between opening of connection 3—4 by segment S3 and the preceding closure of connection 6—7 by a segment S2 lies entirely within the period between opening of connection 1—2 by a segment S4 and reclosure of connection 1—2 by the next segment S4. The time between successive closures of 1—2 determines the length of the amber period during a signal change and, of course, can be suitably altered by choosing a different number of contact segments S4. The connections controlled by the segments S1–S4 are indicated symbolically in FIG. 3.

Segment S1 causes energisation of the tape reader ratchet motor TRM of FIG. 3 once per minute. The steps in the programme are therefore arranged in one minute intervals, and at ten steps per inch of tape, a convenient figure according to standards used on conventional teleprinter tapes, a programme tape twelve feet long will suffice for twenty-four hours.

With the above timing the clearance period for any of the roadways has therefore a minimum length of one minute if governed strictly according to programme. In the embodiment being described this minimum period does in fact apply to the main roadway, but for the minor road the clearance period may be automatically terminated before the end of the programmed period if the traffic in the minor road has cleared or become very thin.

By selecting an alternative disc speed, the basic time period between steps of the programme may be chosen as required.

Referring again to FIG. 3, traffic signals consisting of the usual combination of red (R), amber (A) and green (G) lamps are indicated, four sets serving the main roads and four sets serving the side roads in the usual way. The colour sequences displayed are determined by a four-position switch (LS) comprising ganged sections LS1–LS5. In the position shown this switch LS causes red to be displayed to the main roads and green to the side roads. In the next position clockwise red and amber are displayed to the main roads and amber to the side roads. In the third position green is displayed to the main roads and red to the side roads and in the fourth position amber is displayed to the main roads and red and amber to the side roads. It will be appreciated that this sequence may readily be modified, if as may sometimes be desired, to eliminate the red-amber aspect in going from red to green on either road, the red aspect being maintained for that road during the amber period for the other road.

The switch is driven by an arrangement of ratchet wheel and electromagnet motor which is indicated in block diagram form at LSM and is similar to that previously described in connection with the tape reader in FIG. 2. The switch LS moves one step clockwise on each de-energisation of the motor LSM to which power is supplied through connection 1—2 governed by the segments S4 of the timing switch TS (FIG. 4), contact RL2–1 of relay RL2, and section LS–3 of the signal control switch LS. In the positions shown for the moving arm of LS–3 and the contact RL2–1, being those for clearing the side roads, power cannot reach the motor LSM because of the relative positions of LS–3 and RL2–1. If now relay RL2 is energised to change over the position of contact RL2–1 a pulse of energy of half a second duration is applied to the motor LSM on the next closure of the connection 1—2 by a segment S4. On termination of this pulse the switch steps one position clockwise and four seconds later the next segment S4 applies another half-second pulse of energy to the motor. On termination of this pulse the switch LS again steps one position clockwise and LS–3 now open circuits the motor to any further pulses until relay RL2 is subsequently de-energised to again change over the contacts RL2–1, following which the switch LS completes two further steps at four second intervals and again rests. This change-over action of RL2, if working strictly to programme, takes place at prescribed integral numbers of one minute intervals as indicated by the perforations in the programme tape. It will be seen, however, that a side roads clearance period as dictated by the programme is automatically shortened or missed altogether in conditions of light traffic on the side roads.

A photo-electric detector consisting of a lamp unit LP1 equipped with a suitable lens L1 and a photocell and relay unit PEC1 and RL5 is arranged to "look" at the state of a side road on the approach half of the roadway, preferably behind the stop line. A photoconductive type of cell is suitable and acts as a switch for energising the relay RL5 from a source of direct current potential when the beam of light from the lamp is focussed by the lens L2 on the photocell. The relay RL5 is de-energised when a vehicle interrupts the light beam. Preferably the visible spectrum is filtered from the beam by a suitable mask, the cell operating from the infra red part of the light spectrum. The contacts RL5–1 of the relay RL5 are open when the relay is de-energised and closed when the relay is energised, being thus open in the presence of a vehicle on the side road. A relay RL6 having contacts RL6–1 is associated with a similar photoelectric detector placed in a similar position in the side road on the opposite side of the crossing. The contacts RL5–1 and RL6–1 are thus closed to apply power from the + line to the contacts RL1–2 of relay RL1 and RL4–2 of a relay RL4 only when no vehicle is cutting the light beams in either of the side roads. With RL1 and RL3 de-energised relay RL4 receives energy through the segments S2 each time they close the connection 5—6, this latter connection being in series with the connections 12—13 of relay RL1 and 15—16 of relay RL3. Once energised in this way, relay RL4 remains energised through its own contacts RL4–2 until such time as a vehicle appears to open contacts RL5–1 or RL6–1.

Power fed through contacts RL5–1, RL6–1 and RL1–2 when closed and segment S3 of the timing switch TS when making connection 3—4, energises the relay RL3 which, in addition to the contact RL3–2 already mentioned, has a contact RL3–1 arranged to make connection 15–17 when the relay is energised and 15—16 when the relay is de-energised, connection 15–17 being made before 16—17 is broken. If RL1 is de-energised, the condition for clearing the side road, RL3, having been energised through RL1–2 and S3, will remain energised, taking power from the + source through connection 12—13 of relay RL1 and connection 15–17 of relay RL3, connection 15—16 of relay RL3 being then broken. Segment S2 is now isolated from the + source and relay RL4, if de-energised, cannot be energised. With RL3 energised, contacts RL3–2 energise relay RL2 from the + line as previously mentioned.

Figure 3A:
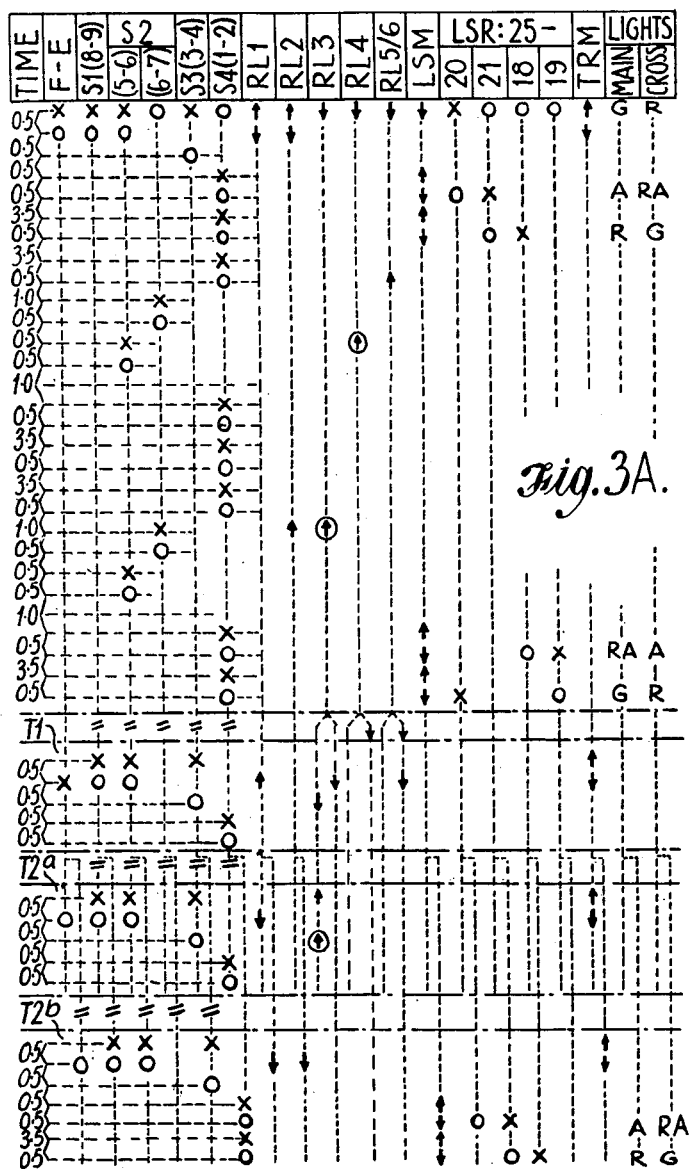
FIG. 3A is a typical sequence chart for the operation of the arrangement of FIGS. 3 and 4.

A typical sequence will now be described demonstrating how extension of a main road clearance period is obtained if cross traffic has cleared before the end of its clearance period. It will be assumed as an initial condition that the main road has clearance and vehicles are waiting in the side road, and starting at the point where segment S1 makes connection 8–9, S2 makes connection 5—6, S3 makes connection 3—4, contacts F–E are made and relay RL1 is energised for main road clearance. Relay RL1 contacts 12—13 are open, isolating S2 from the + supply and RL4 cannot operate. Relays RL5 and/or RL6 are de-energised opening contacts RL5–1 and/or RL6–1 so that RL3 cannot be energised over segment S3 making connection 3—4. The wiper arm of LS3 is making connection 25–20. The tape reader motor TRM is energised over segment S1, picking up one tooth of the ratchet wheel C. These conditions are represented in the first line of the sequence chart of FIG. 3A.

After half a second (second line of FIG. 3A) S1 contacts 8—9 break, and reader motor TRM is de-energised. Assuming that the next programme step is one calling for side road clearance, the programme tape, in the absence of a hole, then insulates contacts F–E and de-energises RL1. Contact RL1–1 now makes the connection 12—13 and breaks the connection 12—14, de-energising relay RL2 and causing contacts RL2–1 to break the connection 22—23 and make the connection 22—24. Relay RL4 cannot be energised because segment S2 has by this time broken connection 5—6. Relay RL3 cannot operate because contacts RL1–2 have broken and contacts RL5–1 and/or RL6–1 are broken.

With connection 22—24 now made, on the next closure of connection 1—2 by a segment S4 the motor LSM is energised and picks up a tooth on the ratchet wheel for driving the switch LS. After a further half second S4 breaks connection 1—2 to de-energise the motor LSM. The switch LS then moves one position forward, LS–3 now making connection 25–21. Amber is presented to the main road and red-amber to the side road.

After three-and-a-half seconds the next segment S4 again makes connection 1—2, energising the motor LSM for half a second to complete a four second amber period. On its de-energisation the motor LSM moves switch LS a further position forward, LS-3 now making the connection 25-18. Red is presented to the main road and green to the side road. The waiting vehicles now start moving out. LS-3 has now isolated the motor from the supply for each further closure of connection 1—2 by the segments S4 until relay RL2 is energised again to change over contact RL2-1 from connection 22—24 to 22—23.

As vehicles pass one or both of the detectors, relays RL5 and/or RL6 will respond. Should there be no vehicle passing a detector when S2 is next making connection 5—6, which it does five times a minute, relay RL4 will be energised by S2 contacts 5—6 and remain closed through its own contacts RL4-2. This action connects RL3 to contact 7 of S2, which will energise RL3 from contact 6 eleven seconds later unless in the meantime a vehicle appears in a detector causing relay RL5 or RL6 to open its contacts RL5-1 or RL6-1 so that RL4 will be de-energised to open contacts RL4-1 and prevent relay RL3 from being energised when connection 6—7 is subsequently made. Contacts RL4-2 would then also be opened so that relay RL4 would remain de-energised until S2 closes contacts 5—6, when it would be re-energised and, if no vehicle is present in a detector, hold in again: the same process is repeated over the ensuing eleven seconds. Assuming however that no vehicle has passed a detector from the time S2 makes connection 5—6 until it again makes connection 6—7, relay RL3 will be energised through contacts RL4-1, contact RL3-1 making the connection 15-17 and then breaking the connection 15—16. RL3 now remains energised over connection 15-17 and S2 connection 6 is isolated from the + supply. Relay RL4 remains energised until a further vehicle appears in the detector when contacts RL5-1 and/or RL6-1 break its holding circuit.

With relay RL3 now energised and held in, relay RL2 is energised through contact RL3-2 providing an alternative energising circuit to that including contact RL1-1 of relay RL1. This causes contacts RL2-1 to change over, breaking the connection 22—24 and making the connection 22—23. The switch LS then proceeds to make two steps forward at four second intervals in a manner similar to that already described, following which LS3 makes the connection 25-20 and isolates the motor LSM from S4 connection 1—2. The condition is now that red shows to the side roads and green to the main roads although the programme still specifies a side road clearance. This condition remains until the time comes for the programme to change to call for main road clearance. When this time comes (T1, FIG. 3A) S1 closes 8—9 picking up a tooth on the tape reader ratchet wheel by energising the motor TRM. After half a second TRM is de-energised and moves the tape A to bring a hole opposite the contact F, resulting in relay RL1 being energised. Contact RL1-1 changes over keeping relay RL2 energised by making connection 12-14. Connection 12—13 is also broken, which causes RL3 to become de-energised if contact RL5-1 or RL6-1 is open consequent on the appearance of a vehicle in a side road detector. If no vehicle is present, however, RL3 remains energised through RL5-1, RL6-1, RL1-2 and the connection 3—4 until this latter connection is subsequently broken by S3. The connection 6 is now isolated from the + supply by the breaking of RL1-1 connection 12—13 so that neither RL3 nor RL4 can be energised during the main road clearance period.

If the end of this clearance period arrives and still no vehicles have appeared in a side road (time T2a) the following action takes place. At the time when the motor TRM is energised by S1 making contacts 8—9, S3 closes contacts 3—4. Contacts RL1-2, RL5-1 and RL6-1 being made, relay RL3 is energised and is held energised by S3 contacts 3—4 for one second. At the middle of this period TRM is de-energised and moves a blank tape between contacts E-F thus breaking their connection and de-energising relay RL1.

The contact RL1-1 now changes over making the connection 12—13 and then breaking the connection 12–14. Relay RL3, being energised and having therefore changed over the contact RL3-1 to make connection 15-17 and break connection 15—16, now remains energised from the + supply through connection 12—13 of contact RL1-1 and connection 15-17 of contact RL3-1. When, therefore, the connection 3—4 is broken by S3 at the end of the one second interval, relay RL3 remains energised and holds relay RL2 energised through contacts RL3-2. This condition remains until the end of the programmed side road clearance period. Since no change has taken place in the condition of relay RL2 the switch motor LSM has been unable to change the signal condition and green continues to show to the main roads and red to the side roads even although the programme specifies a side roads clearance period.

This is followed by a further main roads clearance period, relay RL2 being now held energised by relay RL1 closing in accordance with the programme. When RL1 closes RL3 is de-energised by the breaking of connection 12—13 by contact RL1-1 or by the breaking of connection 3—4 by S3, depending on the presence or absence of vehicles in the side roads. Power from the + supply is restored to contact 6 of switch S2 and any of the above-described actions are repeated as appropriate in the ensuing cycles of events. Again since relay RL2 has not changed its position the switch LS remains stationary and the signals show green to the main roads and red to the side roads.

If at the end of the main road clearance period that was initiated at time T1 (FIG. 3A), a vehicle had arrived in the side road, then the closure of contacts 3—4 by S3, at the same time (TP2p) as S1 closes contacts 8—9 to energise motor TRM, is unable to energise relay RL3 since contacts RL5-1 or RL6-1 are now open. Consequently when the programme tape is stepped to insulate contacts F-E for side road clearance, the resultant de-energisation of relay RL1 and the opening of its contacts 12-14 causes the relay RL2 to become de-energised and to change over its contact RL2-1. Motor LSM is then operated twice by the action of segments S4 and the lights are changed to present red to the main road and green to the side roads exactly as previously described.

Figure 3B:
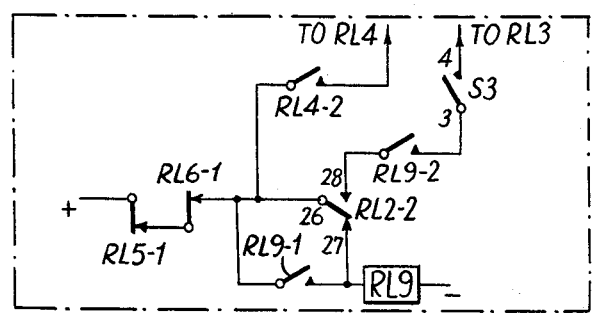
FIG. 3B illustrates a modification of the circuit of FIG. 3, the modification being applicable also to FIG. 5.

With the circuit of FIG. 3 a main road clearance period is extended unless a side road vehicle interrupts the light beam of one of the detectors (contacts RL5-1 or RL6-1 open to prevent energisation of RL3) in the half second during which contacts 3—4 are closed by S3 while relay RL1 is still energised to close contacts RL1-2. Since it might be possible for a vehicle to be present in a side road without interrupting the detector light beam in the critical half-second, the modification shown in FIG. 3B may be introduced in substitution for the portion of the circuit of FIG. 3 included within the chain dotted rectangle. This modification consists of the addition of a relay RL9 having contacts RL9-1 and RL9-2, and the replacement of the contacts RL1-2 of relay RL1 by changeover contacts RL2-2 on relay RL2. The operation is then modified as follows. If the side roads have been given clearance (relays RL1 and RL2 both de-energised) and no vehicle remains in the side roads, then prior to relay RL2 being energised to initiate a change in the traffic lights to give clearance to the main road, relay RL9 will be energised over contacts RL5-1, RL6-1 and RL2-2 making connection 26—27, and will be held energised over contacts RL5-1, RL6-1 and its own contacts RL9-1. Relay RL2 is subsequently energised to initiate a main road clearance either in accordance with programme or in consequence of energisation of the relay RL3 during a programmed side roads clearance as previously described. If at the end of this main road clearance period no vehicles have been detected in a side road, relay RL9 will still be energised so that when S3 closes contacts 3—4 relay RL3 is energised RL5-1, RL6-1 RL2-2 making connection 26-28, RL9-2 and S3. Relay RL2 is therefore held energised over contact RL3-2 to extend the main road clearance period as before. If however, a side road vehicle had been detected during the main road clearance period, the relay RL9 would have been de-energised by the opening of contacts RL5-1, or RL6-1, thereby opening contacts RL9-2. This prevents energisation of relay RL3 when S3 subsequently closes 3—4, thereby inhibiting extension of the main road clearance period.

From the foregoing description it will be appreciated that if the tape reading apparatus were removed to a distance from the remainder of the control arrangement of FIGS. 3 and 4, the system could be made to function if two signals were sent from the reader position, one to control relay RL1 and the other to control the movement of the timing switch TS. This could therefore form a basis for a centralised co-ordinated control system. In such a case the individual longitudinal columns of holes in the tape could control respective programme responding relays corresponding to RL1 and associated at least one with each of a plurality of crossings, the required conditions at such crossings being at any time defined by the particular transverse row of holes being read in parallel at that time. In the simplest arrangement, one column of holes is required to control the traffic signals at any one crossing, the number of columns then being equal to the number of crossings to be controlled. Certain ancillary signals may be controlled, however, to provide, for example, illuminated signs for the purpose of changing the direction of a one-way street at certain times of the day, additional columns of holes being required for this. Another possible arrangement is that separate columns of holes may control respective sets of signals associated with one and the same crossing, as will be seen later.

Regarding the synchronisation of traffic signals it may be desirable for a succession of such signals along, say, a main highway not to be switched to clear traffic in one direction simultaneously, but to be switched in a progressive sequence as previously indicated. In this case the stepping rate of the tape reader is preferably based on the minimum offset time between successive signals. In the following description with reference to FIG. 5 of an application of the invention to the control of a plurality of crossings, the stepping rate of the reader has been chosen as one step every ten seconds for purposes of illustration, without implying any such limitation thereby, in which case a succession of light signals may be controlled to clear traffic in a particular direction either simultaneously or progressively in steps of ten second or multiples of ten seconds, by suitable arrangement of the programmes.

Referring to FIG. 5, which shows an arrangement for controlling the traffic signals at a typical one of a plurality of centrally controlled and co-ordinated crossings, and to FIG. 6 which shows the arrangement of the associated timing switch at the crossing concerned, RL1 is again a programme responding relay performing a function identical to that of RL1 in FIG. 3. The switch TS' of FIG. 6, however, differs from that of FIG. 4 in that an arrangement is provided for stopping the disc at the beginning of each cycle of transmitted control signals. In the example taken for illustration, without implying any restrictive limitations, the disc is driven at a speed of one revolution per minute by a synchronous clock type motor N through the medium of a friction clutch P. The contact segment pattern is repeated to a total of six identical patterns, each pattern therefore passing under the contact fingers in ten seconds.

The stopping arrangement consists of a catch V which engages with any one of six teeth W cut symmetrically in the disc at the positions shown. The catch is released by energising the electromagnet X to lift the catch above the tip of the tooth. This allows the disc to complete one sixth of a revolution before the next stop is reached. The various conducting segments are lettered as in FIG. 4. It will be noted that segment S1 is omitted, segments S2 make connection 5—6 for half a second prior to engagement of the catch and connection 6—7 nine seconds after or one second before making connection 5—6, segment S3 makes connection 3—4 for half a second prior to engagement of the catch and for two seconds thereafter, and segments S4 make connection 1—2 for half a second at four second intervals, the first commencing half a second after S3 breaks connection 3—4. Again these contact lengths and timings are chosen as illustrative examples without implying any restrictive limitations.

Recalling the description of the timing disc of FIG. 4, S2 made connection 5—6 shortly before a programme step was effected and connection 6—7 one second previously or eleven seconds later, S3 made connections shortly before and during a programme step and S4 made connection 1—2 at intervals of four seconds, the first half a second after a programme step. In the transmission system to be described the controls for all the relays RL1 are transmitted on each programme step in the two second period following release of the timing switch catch. Consequently the operation of the control circuit and timing switch of FIGS. 5 and 6 is similar to that of FIGS. 3 and 4 and it is thought to be unnecessary to repeat a description of the operation in detail.

The release of catches on the timing discs at the several crossings takes place simultaneously in response to the receipt of a control signal of special form, repeated every ten seconds. Once the discs have been brought into phase synchronism no clutch slip occurs, the catches being released as each fresh tooth reaches the holding position. In order to phase synchronise, it can be arranged that a cycle of control signal transmission is periodically missed. This results in all catches being dropped to hold the discs for a period of at least ten seconds, at the end of which all discs should be in phase synchronism, the catches being released again when transmission is restored. Such resetting can be controlled by a column of holes on the tape, and convenient positions for arranging a missed cycle occur when two or more successive transverse rows of control holes exhibit identical patterns, indicating that a programme is repeated during the ensuing time interval. Phase synchronisation is merely a safeguard against accidental slip. By employing synchronous clock type motors and common alternating current mains, synchronism once established should remain indefinitely unless the supply to one or more points is accidentally disrupted.

The control arrangement for stepping the tape reader and for initiating transmission at the central location is shown in FIG. 7. A synchronous clock type motor drives a disc D at one revolution per minute. The disc carries six conducting strips S1' making connections 25—26 for half a second at ten second intervals and being the equivalent of switch S1 of FIGS. 3 and 4, these strips serving to energise the tape reader motor TRM. The tape reader having moved a step, a signal is required to instruct the transmission equipment to read the outputs of the plurality of sensing fingers F and to transmit this information to the controlled points. Six conducting strips S5 provide this instruction signal by making connection 26—27 for half a second commencing half a second after S1' breaks connection 25—26. The initiating signal is of polarity negative to earth.

A pulse transmission system which will be described for sending control signals from the tape reader position to the plurality of controlled positions can be used with particular advantage where the distances involved are too great to be economically covered by multicore signalling cable. Such cabling could, however, be used where the distances are short, one wire being required to control all the catches V of the switches TS' (FIG. 6) at the several crossings, separate wires for controlling the respective programme responding relays, such as RL1, and a common return wire serving all circuits.

To take control of a particular crossing manually, in order say to assist the clearance of emergency vehicles, it is only required to isolate the appropriate tape reading finger and provide a manual switch to take its place. Referring to FIGS. 3 and 5, a three-position switch MS may be provided to serve this purpose. On position 1 of this switch the positive line is connected to the reading contact finger F of the tape reader, on position 2 the line is connected to the circuit of the conducting bar E of the tape reader, simulating the main road clearance condition in the arrangement of these figures and on position 3 the line is open circuited simulating the side road clearance condition. Where a plurality of crossings are controlled from a central location, one switch such as MS would be provided for each crossing or for each independently controlled set of signals at such crossing, that is, for each reader finger. Where alternative programmes are provided, one manual switch could be provided for each set of fingers reading such programmes.

Before going on to describe the transmission system, certain modifications and adaptations of the circuits so far described will be considered.

It will be appreciated that the subsidiary control means comprising the vehicle detectors, relays RL2, RL3, RL4, RL5, RL6, relay RL9 if provided, and the connections controlled by S2 and S3, may be omitted and the switch LS directly controlled by the programme responding relay RL1 strictly in accordance with the recorded programme. In this case relay RL1 (in FIG. 3 or FIG. 5) would have a change-over set of contacts which would be substituted for contacts RL2–1 in the control circuit of the switch LS. The segments S4 of the timing switch would still control the stepping action of switch LS to define the amber period, while the segment S1 would control the stepping of the programme tape. This direct control system is assumed for a modified arrangement to be described with reference to FIG. 8A. Alternatively separate segments on the tape could be arranged to define the amber periods as well as the red and green periods as will be described with reference to FIGS. 8B and 8C, thus removing the necessity for having any timing mechanism at all other than the programme stepper.

In case of heavy traffic flow in one direction along a main roadway accompanied by relatively light traffic in the opposite direction serious congestion may occur if many vehicles in the heavy stream wish to turn to the off-side across oncoming traffic in the light stream. In such cases it may be of considerable advantage to be able to hold the light traffic flow for part of the main road clearance periods and thus give the heavy flow free access to all roadways. The facility of holding traffic in one direction only on a roadway may also find application where provision is made for reversing the direction of one way streets at certain times of the day for which purpose a continuous red aspect may be presented to one direction while the normal aspect cycles are presented to the other direction and to the side roads.

An arrangement permitting individual control is illustrated in FIG. 8A in which separate light sequence switches SM1, SM2, SC1 and SC2, driven by respective stepping motors LM1, LM2, LC1, LC2, are provided for the respective roadways at a 4-way intersection. Separate programme responding relays RL11, RL12, RL13 and RL14 are provided respectively for the switches and have change-over contacts RL11–1, RL12–1, RL13–1 and RL14–1 which co-operates with the LS5 banks of the switches to control, in the same manner as did the contacts RL2–1 in FIGS. 3 and 5, the double step action between the red and green positions. The switches are separately controlled from respective columns of holes in the programme tape so that any required clearance combination may be set up, the presence of a hole in the tape being the signal for a clearance condition for the roadway to which the column containing the holes relate. With such an arrangement safety measures are required in order that no unsafe combination of signals will be presented should any failure occur. In FIG. 8A the two switches driven by motors LM1 and LM2 relate to opposite traffic directions along the main road and those driven by LC1 and LC2 relate to the side roads at the intersection. Each switch has six 4-way banks. The two banks LS1 and LS2 of each switch perform the switching of the red, amber and green aspects according to the controlling programmes. Banks LS3 and LS4 provide the safety features. The wiper arms of each of the banks LS3, LS4 are arranged to close a circuit when and only when the switches are in the positions (R) to show red to any roadway, that is, in the positions shown. On energisation of relay RL11, which will take place when the programme calls for a clearance period for the main road to which switch SM2 relates, a circuit is established which includes the contacts 1 and 2 associated with the timing segments S4 as before, change-over contact RL11–1 in its front position, banks LS4 of switches SC1 and SC2 in their red positions, bank LS5 of switch SM2 in its red position, and the switch motor LM2. Provided that the switches SC1 and SC2 are already in their red positions or are first of all changed thereto on the same programme step, the motor LM2 is energised twice under control of the segments S4 and thereby steps the switch SM1 to its green position through its red-amber position the action being as previously described. Consequently a green aspect is presented to traffic on the main road concerned, but only if a red aspect is being presented to side road traffic.

Examination of FIG 8A will show that in a similar manner traffic in the other main road direction can be cleared, in response to energisation of relay RL12, only if the cross traffic is held and that cross traffic can be cleared in response to energisation of relays RL13 and RL14 only if the main road traffic in both directions is held, the interlocking being in all cases provided by the LS3 or LS4 switch banks More complex traffic movements may, of course, be protected by suitably extending the interlocking. In general, it may be stated that specific sequencing arrangements to meet the requirements of any intersection can be obtained by the use of multi-pole, multi-way switches such as LS, constituted for instance by rotary switches, or drum controllers, in conjunction with respective relays such as RL11–RL14 governed in accordance with separate but co-ordinated programmes recorded as respective columns of punched holes on a programme tape.

It will be appreciated that the arrangement of FIG. 8A is capable of producing any non-conflicting combination of signals and an "all red" condition for the benefit of pedestrians is easily provided for by providing a switch MS' operation of which opens the energising circuits of all the relays for the intersection. One pole LS6 from each of switchse M1, M2, C1, C2 may then be connected in series, as shown, to light "cross now" signals C when all switches are at the "red" condition.

The arrangement of FIG. 8A requires the lights to return to an "all-red" condition between clearances, and this is time wasting where a pedestrian crossing period is not required after each clearance. This requirement is absent in the arrangement of FIGS. 8B and 8C, in which, nevertheless, provision can be made for pedestrian crossing periods. The arrangements of FIGS. 8B and 8C function without requiring any amber timing mechanism at a controlled intersection, all timing being accomplished by the controlling programmes.

Referring to FIG. 8B, four programme responding relays RL15–RL18 are controlled, each similarly to relay RL1 in FIG. 3, from separate programme columns on the programme tape. Relay RL15 has a normally open contact RL15–1, a normally closed contact RL15–3 and change-over contacts RL15–3, –4 and –5 Relay RL17 has corresponding contacts RL17–1, –2, –3, –4 and –5. Relay RL16 has a normally open contact RL16–1, a normally closed contact RL16–3 and change-over contacts RL16–2 and –4. Relay RL18 has contacts RL18–1, –2, –3 and –4 corresponding to those of relay RL16. The control positions shown are for the deenergised condition of the relays. Relays RL15 and RL16 together control the traffic lights for both directions of traffic along the main road, while relays RL17 and RL18 together control the side road lights. The separate programmes for these relays should be non-conflicting but interlocking is provided, as will appear, to give protection in case of error or of relay failure.

Considering the control of main road traffic, for a holding period relay RL15 is energised, its column in the programme tape having a hole at the appropriate positions, and relay RL16 is de-energised, its column having a blank. Consequently contact RL15–1 is closed to illuminate the red aspect RM for the main road, this contact also being in the energising circuit for the green aspect GS for the side roads so that the side road can be given clearance if the programme calls for that condition. Contact RL15–3, now open, prevents illumination of the main road green aspect GM, and contact RL15–2, in its right hand position, breaks the circuit for the main road amber aspect AM. When the main road is to be given clearance after a holding period, relay RL16 is energised in consequence of the presence of a hole in its programme column. The programme column for relay RL15 also carries a hole at the corresponding position and this relay therefore remains energised, so that the red aspect is still presented to the main road. However with contacts RL15–2 and RL16–2 now both in their right hand positions, the main road amber aspect AM is also illuminated over a circuit including contact RL15–4 in its lower position. This main road red-amber period is terminated by a blank appearing in the programme column for relay RL15 while a hole appears in that for relay RL16. The consequent de-energisation of RL15 breaks the circuits illuminating the red and amber aspects at contacts RL15–1 and RL15–2 respectively, the latter now being in its left hand position, while the energisation of relay RL16 closes contacts RL16–1. Provided that at this time relay RL17 is energised to close contact RL17–1 and illuminate the red aspect RS for the side roads, and provided also that relays RL15 and RL18 have properly closed their contacts RL15–3 and RL18–3, the green aspect GM will then be presented to the main road to clear it. At the end of the programmed main road clearance, a blank appears in the programme column for relay RL16 without there being a corresponding hole in the column for relay RL15. Consequently relay RL16 is de-energised to open the main road green aspect circuit at RL16–1 and close the main road amber aspect circuit by changing contact RL16–2 to its left hand position. Finally this amber circuit is broken and the main road red aspect is illuminated to complete the cycle, by the energisation of relay RL15 in consequence of the appearance of a hole in its programme column.

The relays RL17 and RL18 control the side road aspects in precisely the same manner, the programmes for these relays being co-ordinated with those for the relays RL15 and RL16 so that conflicting aspects are not presented. That is, green aspects are not presented to the main road and the side road together, although red aspects may be so presented to hold all traffic. Such an "all red" period can be used for pedestrians crossing to which end "cross now" and "wait" signs can be controlled by relay contacts RL15–5, RL17–5, RL16–4 and RL18–4 as indicated, the "cross now" sign being illuminated only when relays RL15 and RL17 are both energised to give red aspects to all roads and relays RL16 and RL18 are de-energised to prevent green aspects being given to any road. At other times the "wait" sign is illuminated. Since the side road green aspect GS is fed through contacts RL15–1 and RL16–3 and the main road green aspect is fed through contacts RL17–1 and RL18–3, the resulting interlocking ensures that unless a red aspect is displayed to the side road the green aspect cannot be displayed to the main road and vice versa.

Change-over contacts RL15–4 and RL17–4 are connected in the circuits for the amber aspects AM and AS on both roads. Under all normal conditions in a cycle, either relay RL15 is energised or relay RL17 is energised, or both are energised, so that at any time at least one of the contacts RL15–4 and RL17–4 should be in its lower position to complete a short circuit round a flashing device FL. If the omission of a hole or holes in the programme tape should call for these relays to be de-energised together (which would usually be an erroneous condition), or if a power failure de-energised all the relays, then the amber circuits would be completed through the flashing device FL over contacts RL15–4 and RL17–4 in their upper positions shown. This flashing device, which may take any known form, and may for instance employ a bimetallic strip or a motor driven commutator switch as its active element, would then intermittently break and make the amber circuit, causing a flashing amber aspect to be presented to both roads. In some circumstances the flashing amber aspect could intentionally be brought about: for instance if night time traffic is very light the programme reader could be stopped for a period during the night at a position with blanks in all columns, resulting in the flashing amber being presented in the manner described. By suitable modification of the relay contact arrangement an amber flashing signal would be given to the main road and a red flashing signal to a minor road.

To cater for individual control of the two directions of traffic on, say, a main road, the circuit of FIG. 8B may be modified as shown in FIG. 8C. Here the individual control is achieved by the addition of a further pair of programme responding relays RL19 and RL20 controlling the red, amber and green aspects RM', AM' and GM' for one direction of main road traffic in the same way as the relays RL15 and RL16 (corresponding to those in FIG. 8B) control the aspects for the opposite direction while the relays RL17 and RL18 control the side road aspects as before. Corresponding contacts from the three pairs of relays are given the same numerical identification as each other. In this case the interlocking is such that green aspects GM and GM' cannot be presented to the main road traffic in either direction unless red aspect RS is presented to the side road traffic, and while green aspect GS cannot be presented to the side road unless both red aspects RM and RM' for the main road are presented together. The relay RL19 is provided with an additional contact RL19–4 inserted for safety in the amber flashing circuit so that a flashing amber aspect cannot be presented with a red aspect. Green auxiliary arrows GA and GA', pointing to the offside, for each direction, to indicate to the appropriate stream an unimpeded turn to the offside, are connected to be illuminated only if traffic in the opposite direction is held by a red aspect in addition to side traffic. To this end, the GA aspect is connected to the lamp side of contact RL16–1 of relay RL16 through a normally open contact RL19–6 of relay RL19 and a normally closed contact RL20–5 of relay RL20. Hence GA is presented only if GM is presented and then only if RL19 is energised to present red aspect RM' to the stream in the opposite direction. As soon as the red and amber aspects are presented to this latter stream prior to clearing it, the GA arrow sign is extinguished. GA' is similarly controlled by being connected to the lamp side of relay contact RL20–1 through normally open contact RL15-6 of relay RL15 and normally closed contact RL16-5 of relay RL16.

Where individual control is exercised for the purpose of changing the direction of a one-way street, green left and right hand arrows may be presented along with the red aspect in the period before change-over, thereby effecting a rapid clearance by diverting all traffic in one direction to the side streets. This facility can also be used when changing a two-way street to a one-way street. Twin green arrows such as GT in FIG. 8C, presented in one direction at all intersections in the street, can be illuminated under control of the same programme column by relays such as RL21 closing contacts such as RL21-1. Likewise twin green arrows such as GT', presented in the opposite direction can be illuminated under the control of another column by relays such as RL22 closing contacts such as RL22-1.

The sequences described with reference to FIGS. 8B and 8C may be accomplished with a smaller number of relays than that shown. It is desirable however to employ a so-called cyclic permuting or continuous progression code of relay movement in making a sequence of changes in a set of aspects: that is, only one relay moves at any time in changing an aspect in any one direction. This prevents the possibility of a short flash of a confusing aspect which might otherwise occur during a transition period due to variations of transit time from relay to relay.

Regarding the possibility of reversing one-way streets, any system providing this facility must fail to safety. An arrangement for controlling the lighting of the appropriate "no left turn," "no right turn" and "no entry" signs is shown in FIG. 9. Two programme responding relays RL7 and RL8 are used operated from respective columns of holes provided additionally for this purpose in the programme tape, two relays being used for safety. RL7 has a set of change-over contacts RL7-1 making connections 28—29 when the relay is de-energised and connections 28—30 when energised. Relay RL8 has a set of normally closed contacts RL8-1 making connection 31—32 when the relay is de-energised and a set of normally open contacts RL8-2 making connection 33—34 when the relay is energised. Four lamps LP1 to LP4 are associated with connection 28-30 of contact set RL7-1, four lamps LP5 to LP8 with contact set RL8-2 and eight lamps LP9 to LP16 with connection 28—29 of contact set RL7-1 in series with contact set RL8-1. When RL7 is energised lamps LP1 to LP4 are lit and when RL8 is energised lamps LP5 to LP8 are lit. If both relays are energised together lamps LP1 to LP8 are lit, and if both relays are de-energised together lamps LP9 to LP16 are lit. Lamps LP1 and LP2 illuminate the "no left turn" signs one on each side of the approach road-way and lamps LP3 and LP4 illuminate the "no right turn" signs on the approach roadway opposite. Lamps LP5 and LP6 illuminate the "no right turn" signs on the roadway served by lamps LP1 and LP2, and lamps LP7 and LP8 illuminate the "no left turn" signs on the opposite approach roadway. Lamps LP9 to LP16 are placed one in each sign so that when illuminated in the case of failure of any of the relays or associated circuits entry to the one-way street is barred. In the case of the crossings at the entrances to one-way streets the appropriate "no entry," "no left turn" and "no right turn" signs would be displayed. In this case lamps LP5 to LP8 would be omitted and lamps LP1 to LP4 allocated one to each of the four signs: lamps LP13 to LP16 would likewise be omitted and lamps LP9 to LP12 allocated one to each sign. It is contemplated that for several minutes, prior to change-over in direction, the street would be sealed by de-energising or energising both relays, thereby allowing the traffic to clear out. The direction is then reversed by energising the appropriate relay in each of the control units. Additional warning notices placed at strategic positions and illuminated by lamps in parallel with the LP9 to LP16 set could read "direction changing" as a warning to traffic in the street during the guard period prior to change-over.

Turning now to the transmission of programme information from a central location to a plurality of intersections or field stations, since the information as obtained from the programme reader has two possible states, being recorded in two-state form, its transmission from the central control location may be effected by a pulse system in which a succession of digit signals are sent, each occupying a definite period of time, with the digit in any particular time period representing the output from the contact finger reading one particular column on the tape. In the transmission system to be described the transmitted digits required at a particular intersection are sorted out under the control of timing signals mixed with the digit signals. A synchronising signal is employed to initiate the digit sorting process and also the control the movement of the timing disc TS' where amber timing arrangements such as that of FIG. 5 are employed at the intersections.

The transmission system can serve a large area and requires only a single pair of wires (or a single wire with earth return) connecting all the field stations in parallel to the central control position. Alternatively, some other form of communication channel could be employed: for instance a carrier wave radio link could be used. The system is electronic in nature, and stated briefly its object is to transmit digital information stored on the programme tape to a number of field stations over a single channel which goes to each of the field stations. The information, which is stored in parallel form on the tape, is transmitted in serial form, to which end the transmitter produces waveforms which are used to convert the stored information into serial form in such a way that it may be easily extracted and interpreted at any of the field stations.

In describing the transmission system, the particular example illustrated in logical form in FIGS. 10 and 11 will be considered, it being understood, however, that this is a non-limiting example. This example provides for the control of fifteen independent programme responding relays from a fifteen-column punched tape (not shown): as is seen from the description of the earlier figures there may be one or more such relay at each field station. Several basic timing waveforms are generated, including a master clock signal and a serialiser which makes available sixteen discrete time periods or "slots" in each cycle of transmission. The output (O/P) gates shown in FIG. 10 are used to serialise the fifteen controls on the punched tape by means of the basic timing waveforms, the remaining time period for the transmission of a synchronising signal. The serialised waveform is fed over the output line to the field stations.

FIG. 10 is a logical diagram showing the overall arrangement of the central control transmitter, including means for generating timing signals and means for mixing with these timing signals the digit signals derived from the tape reader, the composite signal being transmitted to the receiving stations. FIG. 10 is subdivided by dotted lines to show the timing waveform generator portion, shown in detail on FIG. 12, two ring counter portions together defining the digit slots the detailed circuitry for one counter (similar for both) being shown in FIG. 15, and a portion in which the digit signals are derived and mixed with timing and synchronising signals for transmission to the field stations, the detailed circuitry for this last parts being shown in FIG. 16. It is thought that FIG. 10, which is included merely to show the overall system, is self-explanatory when read in conjunction with FIGS. 12, 15 and 16.

FIG. 11, is a logical diagram of a typical field station with the exception of the sequence switching circuits examples of which have already been described. This figure shows how the serialised waveform received at a field station is separated into its various components, and also the way in which each of the sixteen discrete time periods (slots) are again made available to enable the digit in any particular slot, to be extracted and interpreted by setting a programme responding relay in accordance with the control information. The field station includes, so far as is shown in FIG. 11, means for receiving the composite signal, means for separating the digit signals from the timing signal, and means for selectively extracting and staticising a specific digit signal for controlling a programme responding relay and also, where necessary, a timer stepping relay at the field station. Again FIG. 11 is subdivided and shown in detail in other figures. Thus the detailed circuitry for separating the digit, timing and synchronising signals from the composite incoming signal is shown in FIG. 17, this figure also showing the circuitry for sampling the digit signals; a staticiser circuit for controlling a programme responding relay in accordance with an extracted digit signal is shown in FIG. 18, together with circuitry for controlling a relay corresponding to the timing disc control relay RL10 in a field station employing an arrangement such as that of FIG. 5; and the circuitry for the ring counters, which is the same as for those used in the transmitter, is as shown in FIG. 15. It is thought that FIG. 11 is self-explanatory when read in conjunction with FIGS. 15, 17 and 18.

The transmission system is conveniently timed from the A.C. "mains" supply, although it must be understood that any other available A.C. source may be used; for instance an oscillator may be provided to produce the necessary timing signal. The electronic circuits use junction transistors throughout as their active elements, these transistors being connected in two basic modes, namely as two state devices operating with the emitter ($e$) grounded, and as amplifiers with grounded collector ($c$). Input signals are fed to the bases ($b$) of the transistors either directly or by means of resistances or condensers depending upon the nature of these signals and other circumstances. The basic mode of operation of the transistors is not affected by the form of base connection, each of the above forms being used in the following circuitry. These circuits may be designed to provide reliable operation unaffected by any possible spread of transistor characteristic. Here again it is to be understood that thermionic valves could, if desired, be used instead of transistors, the circuits being suitably modified.

Referring to FIG. 12, "mains" supply from transformer T1 is suitably "squared" by transistors TR1 and TR2 connected as two state devices with grounded emitters. TR1 is normally conducting by reason of its base ($b$) being taken to a negative potential through R1. The collector ($c$) will therefore be at earth potential and diode D1 will be nonconducting when the "mains" supply is in its negative excursion. As the "mains" becomes more positive than earth, diode D1 will conduct and the base of transistor TR1 will become postive to the earthed emitter ($e$), thus cutting off the flow of current from emitter to collector. The potential of the collector then falls rapidly to the negative transistor supply potential. When the "mains" falls again below earth diode D1 cuts off and the base potential also falls below earth, allowing current to flow once more from emitter to collector so that the potential of the collector rises rapidly to earth again. Transistor TR2 is used to further square the output from the collector of TR1, the base of transistor TR2 being fed through condenser C1.

The output from the collector of TR2 is used as the basic timing signal, being hereafter termed the clock signal and having the waveform ($a$) shown in FIG. 13. It is fed to transistor TR3 which supplies the clock signal to the subsequent stages with low output impedance, the supply signal obtained from the emitter of TR3 being the same as the signal on the base $b$. The circuit of transistor TR3 has the grounded collector configuration and by reason of its action will hereafter be known as an emitter follower, the emitter following the base signal.

Short duration negative signals, referred to as strobe signals ($b$ in FIG. 13) are produced by feeding the clock signal through condenser C2 to the base of transistor TR4, the time constant C2R6 determining the duration of these negative signals. An "AND" gate including diodes D4 and D5 fed respectively with the clock and strobe signals, drives the base of an emitter follower transistor TR5. Since the base of transistor TR5 follows the most negative of the two waveforms fed to diodes D4 and D5, a delayed clock signal ($c$ in FIG. 13) is produced at the emitter of TR5. The delayed clock signal is changed in level by resistances R10 and R11 and fed to the base of transistor TR6. The signal obtained from the collector of this latter transistor is indicated at ($d$) in FIG. 13 and will be called the inverse delayed clock signal. This signal is also fed out by means of an emitter follower TR7.

The programme information is transmitted, in digit form, after each step change of the programmes, and this transmission can be initiated as previously explained by closure of connection 26—27 (S5) by the step timing disc D of FIG. 7 one second after the programmes have been stepped by closure of the connection 25—26 (S1'). Initiation and termination of a transmission cycle is effected through a bistable junction transistor flip-flop consisting of transistors TR8 and TR9 (FIG. 12). This circuit may be triggered through either C3 or C4. If TR8 is in the non-conducting state (in which case TR9 is conducting) it may be triggered into the conducting state by applying a negative signal to C3, this being done by the closure of connection 26—27 by S5. Similarly TR9 may be triggered into the conducting state, if it is non-conducting, by a negative signal applied through C4. The output from the collector of TR9 is applied, together with the strobe signal from transistor TR4, to an "AND" gate including diodes D14 and D15. With TR9 cut off, which will occur following closure of connection 26—27 one second after a step change in the programmes has been initiated, the gate D14-D15 is conditioned to pass the negative strobe signals to the base of an emitter-follower transistor TR10 and thence to the first of two four-stage ring counters (see FIG. 10). The first of these counters, the "P pulse" counter, responds to successive strobe signals to produce from its four stages the respective outputs P1, P2, P3, and P4 shown in FIG. 13 while the other counter, the "B pulse" counter responds to successive P4 outputs from the "P" pulse counter to produce from its four stages the respective outputs B1, B2, B3, B4 shown in FIG. 13. The counter outputs P1–P4 and B1–B4 together define sixteen distinctive time periods in which the fifteen programme digits then being read, preceded by a synchronising signal, are serialised and transmitted to the plurality of field stations. Transmission is stopped as soon as all digit signals have been transmitted; that is, at the end of the time period P4B4. The P4, B4 and clock signals are therefore applied to an "AND" gate including diodes D11, D12 and D13 and the resulting negative signal, obtained only when all three are negative, is applied through C4 to trigger TR9 into conduction, with the result that the gate D14–D15 is closed to the strobe signals and the transmission is consequently stopped. The clock signal is used here in addition to the P4 and B4 signals in order not to stop the sequence of digit signals being transmitted before the digit occurring in the P4B4 time period has been transmitted.

Each ring counter in the transmitter, and also each ring counter employed in the field stations, as will hereinafter be described, may take the form illustrated in FIG. 15. The number of stages in the counter is chosen as may be most suitable, four being chosen in the present instance since then two counters operating in conjunction will provide the necessary sixteen time periods.

The counter circuit is designated such that under stable D.C. conditions only one of four counting transistors CTR1–CTR4 is non-conducting while each of the other three are conducting. Assuming CTR1 to be the transistor which is cut off on non-conducting, then its collector will be at a negative potential of —C volts which will be applied to the bases of transistors CTR2, CTR3 and CTR4 through the resistances CR8, CR15 and CR21, resulting in base current being drawn from CTR2, CTR3 and CTR4. The circuit is designed so that the current drawn is sufficient to make these transistors conduct. On the application of a negative input signal to condenser CC3 the voltage at point P (which under D.C. conditions is slightly positive to earth) is taken negative, so drawing current through diode CD3 and changing the state of transistor CTR1. Transistor CTR1 therefore conducts and its collector potential rises to earth, the subsequent effect of this being to drive the base of transistor CTR2 positive through condenser CC4 and thereby cut off this latter transistor. Stable conditions now exist with CTR2 off and with CTR1, CTR3 and CTR4 conducting. The next negative input signal triggers CTR2 on through CC5 whilst CTR3 is cut off by the positive going signal then appearing at the collector of transistor CTR2. Similarly CTR4 and CTR1 are cut off by succeeding input signals, thus completing the ring formed by the four transistors. The outputs P1–P4 or B1–B4 appear on the collectors of CTR1, CTR2, CTR3 and CTR4 respectively and occur in time sequence relative to each other with reference to the input signal. Since the signals derived from the collectors and transistors CTR1 to CTR4 are subsequently used to supply current to several gates they are each fed out through emitter follower stages CTR5 to CTR8.

The "P" and "B" pulse signals produced in time sequence by the counters in the transmitter are selected according to the digits detected by the reader fingers as having to be transmitted on the successive time periods defined by these pulses. This is done in the circuit of FIG. 16, in which also the selected signals, constituting the digit signals, are mixed with the timing signals for transmission.

The circuit of FIG. 16 responds to negative potential control signals from the reading apparatus. The circuitry of the reading apparatus is therefore modified as shown in FIG. 5A in which the various components serve the same functions as the similarly lettered components in FIG. 3 but that the output to the transmitter is taken from the reader fingers with the conducting bar E connected directly to a negative line.

Referring to FIG. 16, the fifteen inputs from the reader fingers, numbered 2–16 and relating to the respective programme columns on the punched tape, are connected in the manner indicated, with only the connections for inputs 2, 3 and 4 being actually shown. As has been described these fingers either contact the tape, in which case the inputs are open circuit, or a hole appears in the tape through which the finger makes contact with the conducting bar E (FIG. 2) at a negative potential. Considering input No. 2, when the finger providing this input is insulated from the conducting bar E by the absence of a hole, this represents an open circuit between the finger and the diode OD3, and current therefore flows from the positive line through OR3, OD3 and OR4 to the negative line. Point D is thereby set at some potential such that diode OD4 is cut off and the signal P2 is not allowed to be transmitted. If, however, the finger makes contact with the conducting bar E through a hole in the punched tape then input No. 2 will be at a negative potential which is chosen so that diode OD3 is cut off whatever the signal on diode OD4, current now flowing through OR3 to input No. 2. The point D is now allowed to follow the signal P2 through the diode OD4. This signal and the signals P3 and/or P4 if likewise selected by the inputs 3 and 4, then feed through an "OR" gate including diodes OD10, OD11 and OD12 to the base of an emitter follower transistor OTR1. The pulses P1–P4 are likewise accepted or rejected by the inputs 5–8 respectively, by the inputs 9–12 respectively and by the inputs 13–16 respectively, being in each case fed to the base of a transistor corresponding to OTR1. No input No. 1 is used since the P1 pulse period occurring in the B1 pulse period is used for transmission of a signal for synchronizing all field station ring counters, as will be explained later.

The outputs from the four emitter followers such as OTR1 are mixed with the B1, B2, B3 and B4 pulses respectively in "AND" gates OD13–OD14 to OD19–OD20. By gating the emitter follower outputs with the B periods through diodes D13–D20 it is ensured that each of the inputs may be gated out in the relevant P period only in one B period for each sequence of signals. The signals to be transmitted in each B period are mixed with each other through four diodes OD21–OD24 of an "OR" gate and applied to the base of transistor OTR2. The waveform then appearing at the emitter of transistor OTR2, this waveform being the gated information shown at (e) in FIG. 13 consists of a sequence of negative potential mark digits (M) obtained in periods relating to fingers under which there are holes in the programme tape, and space digits (S) obtained in periods relating to fingers under which the tape is unpunched.

In order to extract digit signals from the transmitted information at the field stations it is necessary for the ring counters at the field station to be in time synchronism with the ring counters at the transmitter. This is achieved by transmitting the clock signal to each of the field stations. It is thus ensured that all the ring counters are driven by the same signal and therefore at the same rate. This, however, does not necessarily mean they will be in phase. A synchronising pulse occurring at the beginning of each sequence of signals is therefore transmitted together with the digit and clock signals to each of the field stations. This ensures that all the ring counters in the field stations are set to the same state as those in the transmitter. It is therefore required to transmit a composite signal (namely the line output waveform (h) in FIG. 13) comprising the gated information waveform (e) superimposed with a distinctive synchronising pulse on the clock signal. To this end, the gated information on the collector of transistor OTR2 (FIG. 16) is mixed with the inverse delayed clock signal (d) in an "AND" gate including diodes OD27 and OD28, the resulting signal being shown at (f) in FIG. 13. This signal is level-changed by resistances OR25 and OR26 and applied to the base of transistor OTR3, the signal on the collector of which is shown at (g) in FIG. 13. The synchronising signal is provided by feeding a transistor OTR5 through a level changer consisting of resistances OR18 and OR19 from an "AND" gate, including diodes OD25 and OD26, which produces a signal in the P1B1 time period. The signal on the collector of transistor OTR5 having a high level set by the potential divider OR21 and OR22, is applied to an emitter follower transistor OTR6 to produce at the emitter of the latter a signal called the high level PB signal which is of greater amplitude than the other signals and is produced in the P1B1 period at the start of every sequence of signals. Since this signal is used as the synchronising signal, the time it occupies cannot be used to transmit digit signals, it being for this reason that only fifteen finger controls are transmitted in each sequence of sixteen time periods. The signal (g) from transistor OTR3 is mixed, in an "OR" gate including diodes OD30, OD31 and OD32, with the delay clock signal (c) and the synchronising signal derived from transistor OTR6. The resulting line output waveform h, which fed to the output line by means of the low output impedance emitter follower transistor OTR4, therefore comprises for each sequence of sixteen time periods, a synchronising pulse (r) of greatest magnitude followed by fifteen pulses of which those (m) corresponding to marks in the gated information waveform (e) are greater than those (s) corresponding to spaces.

In FIG. 13 the gated information waveform (e) is repeated at (i) to show possible delay on the rising edges of the waveform. If this waveform had merely been mixed with an inverse but undelayed clock signal (j in FIG. 13) a signal k would have been produced having undesirable spikes r resulting from the presence of these slow rising edges. It is to avoid this that the gated information is mixed with the inverse delayed clock signal (d).

Referring now to FIG. 17, which relates to any one field station, the line input from the transmitter (waveform h of FIG. 13) is fed to an emitter follower transistor STR1 in order that very little signal current is taken by each field station. This emitter follower feeds the input signal to circuits which separate the digit signals from the timing (clock) and initiating (reset) signals. The circuit leading to STR2 is designed to have a short time constant such that when STR2, which is normally conducting, receives the positive-going edge of an input pulse, condenser SC1 is charged up. This cuts off transistor STR2 until the condenser discharges again through SR2, when the base falls below earth and STR2 again conducts until the next positive edge, which repeats the process. An emitter follower transistor STR5 produces an output which follows the potential variations of the collector of STR2, and since the incoming signal provides a positive edge in every slot the output from STR5 will be a strobe signal (b in FIG. 14) synchronised with the clock signal of the transmitter. This strobe signal corresponds to the strobe signal in the transmitter and is used to drive the ring counters situated in the field station. These ring counters define the serial time slots, as they do in the transmitter, and the counter output occurring in the slot period allocated to a particular programme responding relay at the field station concerned is used to selectively extract the digit signal the control signal for the particular field station for that relay, the particular slot allocated thereto being determined by which one of the inputs (Nos. 2–16) to the seraliser and transmitter of FIG. 16, is provided by the finger reading the programme for that relay.

The signal from transistor STR1 is also fed to transistor STR3 through a level-changer consisting of resistances SR4 and SR5. Conditions are so set that transistor STR3 is normally conducting but on receiving a positive input pulse of higher amplitude than the control pulses it will change to the non-conducting condition. Since the only signal of such amplitude is the synchronising pulse (r) in the P1B1 period, this can be extracted to synchronise the ring counters at the field station with the ring counters at the transmitter. The extracted synchronising signal as it appears on the collector of transistor STR3 is negative. This is inverted through transistor STR6 and applied through emitter follower STR14 to the bases of the first stage transistors (CTR1) in the ring counters through a condenser and diode such as CC1 and CD1 as shown in FIG. 15. The positive signal obtained from transistor STR6 will thus drive the first stage transistors of the counters into the non-conducting state at the correct time, that is at the beginning of every sequence of signals.

The input waveform (h) is also fed to transistor STR4 (which is normally conducting) through resistors SR7 and SR8. Conditions are set so that on receipt of each pulse corresponding to a mark, but not on pulses corresponding to spaces, transistor STR4 is cut off for the duration of the pulse. The waveform appearing on the collector of transistor STR4 therefore corresponds in antiphase to the sequence of pulses corresponding to marks. This waveform is further inverted through transistor STR6 to provide an in-phase sequence.

The means for selectively decoding or interpreting the controls at any particular field station requires that the particular time period allocated to the or each programme responding relay at that station be specified. Such programme responding relay must be governed by its own slot, and that slot only, in accordance with the digit then received. To ensure this operation the digit received in each slot is "sampled" in the following manner by means of a signal occurring at the centre of the slot.

A monostable multivibrator comprising transistors STR9 and STR10 in FIG. 17 is stable with STR9 conducting and STR10 non-conducting. A positive strobe signal (c in FIG. 14), which is produced by inverting the negative strobe from transistor STR5 through transistor STR8, is applied through condenser SC6 to trigger STR9 into the non-conducting condition. The time for which it remains in this condition is set by the time constant SC8 (SR21+VR1) and is selected so that STR9 reverts to its normally conducting condition and STR10 to its normal non-conducting condition at a time coinciding with the middle of each digit slot. The resultant signal at the collector of STR9 is as shown at (d) in FIG. 14 and the positive edge produced each time STR9 starts to conduct again is used to produce a sampling pulse (e in FIG. 14).

Transistor STR11 is normally conducting by reason of its base being taken to a negative source of potential through resistance SR26. When the positive rising edge from the collector of STR9 appears, it drives the base of STR11 positive to earth through condenser SC9, cutting off transistor STR11. The base then slowly returns to its negative level at a rate depending upon the rate of discharge of SC9 through SR26, that is, upon the time constant SC9, SR26. When SC9 has discharged sufficiently to lower the base below earth potential transistor STR11 will again conduct. The sampling pulse is taken from the collector of STR11.

Knowing the particular time period in which a digit intended for a particular programme responding relay at the field station will be transmitted, an "AND" gate including diodes SD7, SD8, SD9 and SD10 is fed with the particular P and B pulses defining this time period, together with the sequence of inverted control pulses from transistor STR4, and with the sampling pulses from STR11. The output from this "AND" gate, which is on the base of transistor STR12, is always at the potential of the most positive of the four applied waveforms, and it follows that it will only fall negative when all four waveforms are negative. There will therefore only be an output from this "AND" gate, and consequently from the emitter of emitter follower transistor STR12, if a pulse corresponding to a mark is received in the specified time period. P and B signals may be fed to this "AND" gate to extract a mark digit from any particular time period as required.

In a similar way an "AND" gate consisting of diodes SD11, SD12, SD13 and SD14 is used to provide an output when a pulse corresponding to a space is received in the particular time period specified by P and B signals applied to this latter gate. It is apparent that there cannot be both a sampled mark output and sampled space output during the same time period.

Referring now to FIG. 18, this shows the way in which the extracted signal from a specified time period can be used to control a programme responding relay, such relay being labelled RL and being typical of any one of the programme responding relays specifically referred to hereinbefore.

A bistable flip-flop formed by transistors FTR1 and FTR2 in FIG. 18 operates in a similar way to that formed by transistors TR8 and TR9 in FIG. 12. In this case the transistors FTR1 and FTR2 are triggered through condensers FC1 and FC4 by the sampled space and sampled mark outputs respectively from FIG. 17.

If a sampled space output is present, transistor FTR1 is triggered on and transistor FTR2 is triggered off. The collector of transistor FTR1 is therefore at earth potential and transistor FTR3, which is fed through a level changer consisting of resistances FR15 and FR16, will be cut off owing to its base being more positive than its emitter. No current will flow through the relay RL in the collector circuit of transistor FTR3 and the relay therefore remains normally de-energised and inoperative, which is what is required since a space digit in the gated information waveform (*h*) corresponds to the absence of a hole in the punched hole programme for the responding relay concerned. If a sampled mark is present, however corresponding to the presence of a hole, then transistor FTR2 will be triggered on through FC4 and transistor FTR1 will be triggered off. The collector of transistor FTR1 will now have a negative potential and FTR3 will be switched into the conducting state. Current will then flow through the relay RL, thereby energising this relay to close any normally open contact such as RL-1 thereof and closing its contacts RL-1, to open any normally closed contact such as RL-2. It can be seen therefore that the relay RL is set into one of its two positions depending upon the extracted information.

Still referring to FIG. 18, a bistable flip-flop formed by transistors FTR4 and FTR5 can be used to control the timing switch TS (FIG. 6) required for the arrangement of FIG. 5. In the P1B1 time period the P1 and B1 pulses are applied through an "AND" gate including diodes FD16 and FD17 and through condenser FC9 to trigger transistor FTR5 on and transistor FTR4 off. This in turn switches FTR6 on to energise relay RL10. Relay RL10 energises the timing switch release magnet X (FIG. 6) through contacts RL10-1 thereby releasing the catch V and allowing the timing switch disc to rotate. In the final time period P4B4 of the sequence, transistor FTR4 is switched on again, and transistor FTR5 switched off, by the application of the P4 and B4 pulses through the "AND" gate including diodes FD10 and FD11 and from there through the condenser FC6. As a result relay R10 is de-energised and magnet X is also de-energised, allowing the catch V to drop ready to engage with the next tooth W and stop rotating of the timing disc.

To give a final example of the operation, suppose a field station equipped as in FIG. 5 is to be instructed to change its traffic lights from side road clearance to main road clearance. A hole appearing in the correct place on the programme tape causes the production of a control mark in the appropriate time period of the serial output waveform (*e*). The mark is transmitted as a pulse of corresponding magnitude and is selectively decoded as a sampled mark in the field station, where it is used to energize relay RL1. Relay RL1 then indicates to the traffic signal control circuit shown in FIG. 5, through contacts RL-1, that the traffic lights should give main road clearance.

Considering the central control equipment for a system in which all clearance, holding and amber aspects are defined by the central programme as in FIGS. 8B or 8C, such systems being preferred in view of the small amount of equipment required at each intersection, a fully flexible system allowing independent two-way control on a main road but without other auxiliary facilities requires six columns of holes in the programme tape (one for each of the relays RL15-RL20 in FIG. 8C) for each intersection. In the absence of independent two-way control on the main road, four columns of holes (one for each of the relays RL15-RL18 in FIG. 8B) are required per intersection. Taking an average of five columns per intersection, in a flexible progressive control system covering, say, 100 intersections some 500 columns are apparently required to specify the sequences at the 100 intersections. In the case of a city having a "grid-iron" street layout in which the streets cross mainly at right angles and are fairly uniformly spaced, this requirement can be substantially reduced since the sequences of sets of signals spaced a number of blocks apart can be arranged precisely in synchronism and hence can be controlled by the same set of hole columns on the programme tape. Assuming however the worst possible case where separate set of columns are required for each intersection, six reader units each carrying a ten-inch wide tape and stepping in parallel could give the capacity required and this would not be prohibitive since the readers and tape can be relatively simple and inexpensive. Since the amber periods are specified on the programme tape it would likely be necessary to have a reader stepping rate which can allow the amber period to be specified in at most two second steps and possibly even in one second steps; that is the programme would have to be stepped once every one or two seconds instead of once every ten seconds as assumed in describing FIGS. 5-7. This means that a tape or tapes covering twenty-four hours would be 360 or 720 feet long at ten holes per inch spacing. Tape folding automatically in concertina fashion into a flat stack in the receiving bin T (FIG. 2) is ideally suitable in such a case and occupies very little space. The programme can be repeated on successive days by turning the stack over and reinserting the start end in the reader at some time when all intersections can be showing flashing amber, say around 2 a.m.

Regarding the digital transmission system for such an embodiment it is either necessary to make the field station at each intersection capable of receiving the whole of the digital transmission (comprising 500 digits) or part of it. In the first case the staticisers controlling the pragramme responding relays in each field station would have access to all of the digits transmitted but would be effectively coupled respectively, only to those allocated for control at the intersection concerned. Thus for the large 500 digit system quoted as an example, the field station timing system would require to be extended, by extension of the ring counters, to produce the required 500 sequential "slots" or time periods. Since no amber timer with its mechanical synchronising latch is required at the field station in the case being considered, the received synchronising signals are used only to reset the ring counters and the speed of transmission can therefore be increased to the 500 digit per second rate or over that may be required in such an embodiment.

A field station may be arranged to receive only that part of the transmission which contains information relative to that station. It is then necessary to use an addressing system, which may take one of several forms. As an example say that 512 digits require to be transmitted. The frame of signals may be divided into 32 blocks each of 16 digits. The counters at each field station can then be arranged to produce only sixteen sequential slots and to cycle only in response to the transmission of one block of 16 digits, which block would contain all the information for the station concerned. It is necessary to distinguish the various transmission blocks and this can be achieved by utilising tone carriers similar to those used in teleprinter transmissions. As it is only necessary to make the distinction in the timing portion of the transmitted signal, since in its absence a "field" station counter system remains quiescent, each block of sixteen digits can be accompanied by a timing signal generated by modulating a tone generator with the timing signal waveform. Separate and distinctive tone frequencies modulated in each case by the timing waveform would then accompany the transmission of each block of sixteen digits, a total of 32 tones being required. The particular modulated tone signal destined to operate on a particular field station would then be accepted at that station by a filter arranged to pass that tone and reject all others. Any other arrangement of block could be chosen, say 16 blocks each of 32 digits, requiring 16 tones, or 8 blocks of 64 digits requiring 8 tones.

A further possibility is the use of a digital code addressing system in which the digital timing systems in all field stations step together but the first portion of each block of digits consists of a number of coded address digits. The field stations would have facilities for decoding the address digits and only those stations intended to receive the remainder of a block of digits respond by rendering their staticisers effective to accept part or the whole of the remainder of the block.

What we claim is:

A programmed automatic traffic signalling system including a programme storing device of a kind capable of storing long term programmes, said programme storing device having a plurality of programme defining elements arranged thereon in a programme pattern which individually programmes for a traffic phase at an intersection at least the ends of successive clearance periods and of successive holding periods in a succession of cycles of traffic signal operation covering periods of differing traffic conditions and differing one cycle from another according to the traffic conditions expected in such periods, said programme storing device comprising a long strip, a pair of receptacles in one of which, initially, the long strip is stored and into the other of which the strip is fed, said system also including a programme reading means for translating said programme defining elements into corresponding control signals, said programme reader having a roller over which said strip passes and with which it is entrained in travelling from one receptacle to the other, a ratchet wheel fixed for rotation with said roller, a driving pawl engaged with said ratchet wheel, an electromagnet connected with a source of current, timing means periodically connecting said source of current to the electromagnet, and means operated by said electromagnet for moving the driving pawl, a programme responding device located at said intersection, means for passing said control signals to said programme responding device, said latter device being responsive to said signals, and means governed by said latter device for controlling the operation of the traffic signals at the intersection in accordance with the response of said latter device to the control signals and therefore in accordance with the programme pattern.

References Cited in the file of this patent

UNITED STATES PATENTS

| | | |
|---|---|---|
| 1,723,062 | Neil | Aug. 6, 1929 |
| 1,817,754 | Massey | Aug. 4, 1931 |
| 1,948,710 | Harte | Feb. 27, 1934 |
| 2,126,144 | Shepherd | Aug. 9, 1938 |
| 2,665,417 | Allis | Jan. 5, 1954 |
| 2,761,119 | Barker | Aug. 28, 1956 |
| 2,826,752 | Hendricks et al. | Mar. 11, 1958 |
| 2,832,060 | Hendricks | Apr. 22, 1958 |
| 2,832,071 | Hendricks | Apr. 22, 1958 |

FOREIGN PATENTS

| | | |
|---|---|---|
| 719,121 | Great Britain | Nov. 24, 1954 |

OTHER REFERENCES

"New Dearborn Control System," Pearson, The American City; October 1947, pp. 133, 135.